United States Patent
Gautam et al.

(10) Patent No.: US 11,954,066 B2
(45) Date of Patent: Apr. 9, 2024

(54) COALESCING STORAGE LOG ENTRIES

(71) Applicant: Cohesity, Inc., San Jose, CA (US)

(72) Inventors: Amandeep Gautam, San Jose, CA (US); Anand Arun, San Jose, CA (US); Debasish Garai, Santa Clara, CA (US); Rupesh Bajaj, Dewas (IN); Himanshu Mehra, Mountain View, CA (US); Vairavanathan Emalayan, Vancouver (CA); Apurv Gupta, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 225 days.

(21) Appl. No.: 17/381,514

(22) Filed: Jul. 21, 2021

(65) Prior Publication Data

US 2023/0029099 A1 Jan. 26, 2023

(51) Int. Cl.
*G06F 16/11* (2019.01)

(52) U.S. Cl.
CPC .................. *G06F 16/128* (2019.01)

(58) Field of Classification Search
CPC .................................................. G06F 16/128
See application file for complete search history.

(56) References Cited

U.S. PATENT DOCUMENTS

| | | | |
|---|---|---|---|
| 5,522,037 A | 5/1996 | Kitagawa | |
| 6,434,681 B1 | 8/2002 | Armangau | |
| 6,981,114 B1 | 12/2005 | Wu | |
| 7,925,631 B1 * | 4/2011 | Thillai | G06F 16/128 707/649 |
| 8,412,688 B1 | 4/2013 | Armangau | |
| 9,501,487 B1 | 11/2016 | Yuan et al. | |
| 9,697,268 B1 | 7/2017 | Prater | |
| 10,102,144 B2 * | 10/2018 | Sundararaman | G06F 12/0269 |
| 10,324,798 B1 | 6/2019 | Natanzon | |
| 10,621,049 B1 | 4/2020 | Certain | |
| 10,761,941 B1 * | 9/2020 | Redko | G06F 11/1451 |
| 10,853,182 B1 | 12/2020 | Vig | |
| 11,556,501 B2 * | 1/2023 | Pogde | G06F 11/1451 |
| 2004/0260726 A1 | 12/2004 | Hrle | |
| 2005/0182953 A1 | 8/2005 | Stager | |
| 2007/0266062 A1 | 11/2007 | Young | |
| 2008/0168567 A1 | 7/2008 | Hahn | |
| 2009/0300080 A1 | 12/2009 | Stringham | |
| 2012/0124649 A1 * | 5/2012 | Zhao | H04L 61/5084 726/4 |

(Continued)

*Primary Examiner* — Robert W Beausoliel, Jr.
*Assistant Examiner* — Susan F Rayyan
(74) *Attorney, Agent, or Firm* — Shumaker & Sieffert, P.A.

(57) ABSTRACT

An identification of a new primary snapshot created for a primary storage system is received. A change tracking time window that is at least a portion of a period between a first capture time associated with a previous primary snapshot and a second capture time associated with the new primary snapshot is determined. Entries of a storage log of the primary storage system occurring within the change tracking time window are analyzed to coalesce changes identified in the entries of the storage log occurring within the change tracking time window into a change tracking result set. The change tracking result set is used to identify at least a portion of data changes between the previous primary snapshot and the new primary snapshot to capture in a new backup snapshot stored at a secondary storage system.

20 Claims, 16 Drawing Sheets

(56) References Cited

U.S. PATENT DOCUMENTS

| | | | |
|---|---|---|---|
| 2013/0132346 A1* | 5/2013 | Varadarajan | G06F 11/1448 707/639 |
| 2014/0089264 A1* | 3/2014 | Talagala | G06F 11/1448 707/649 |
| 2015/0227575 A1* | 8/2015 | Jaquette | G06F 16/11 707/645 |
| 2016/0364156 A1 | 12/2016 | Haustein | |
| 2019/0026187 A1 | 1/2019 | Gulam | |
| 2020/0125531 A1* | 4/2020 | Troshin | G06F 16/9038 |

* cited by examiner

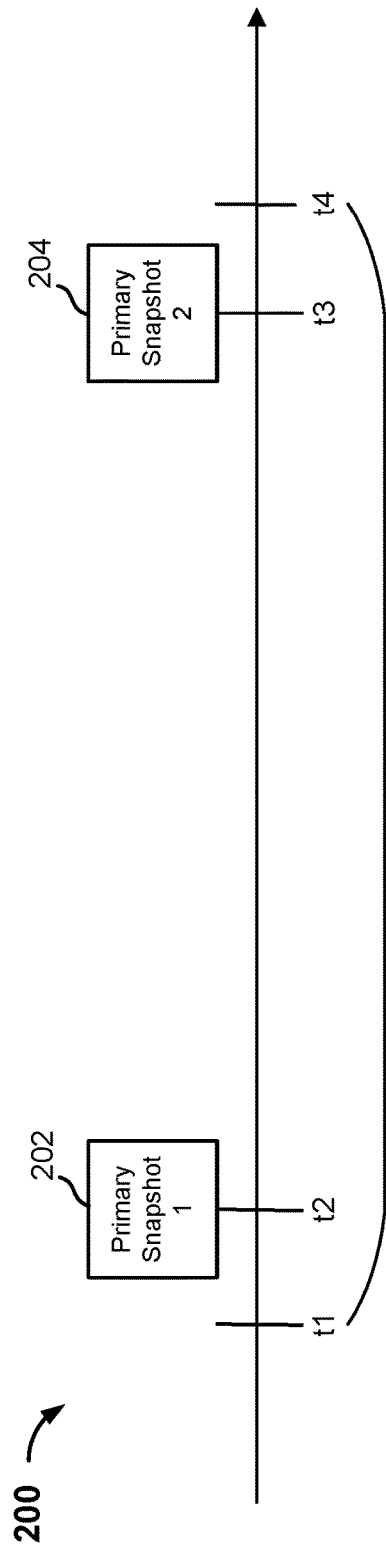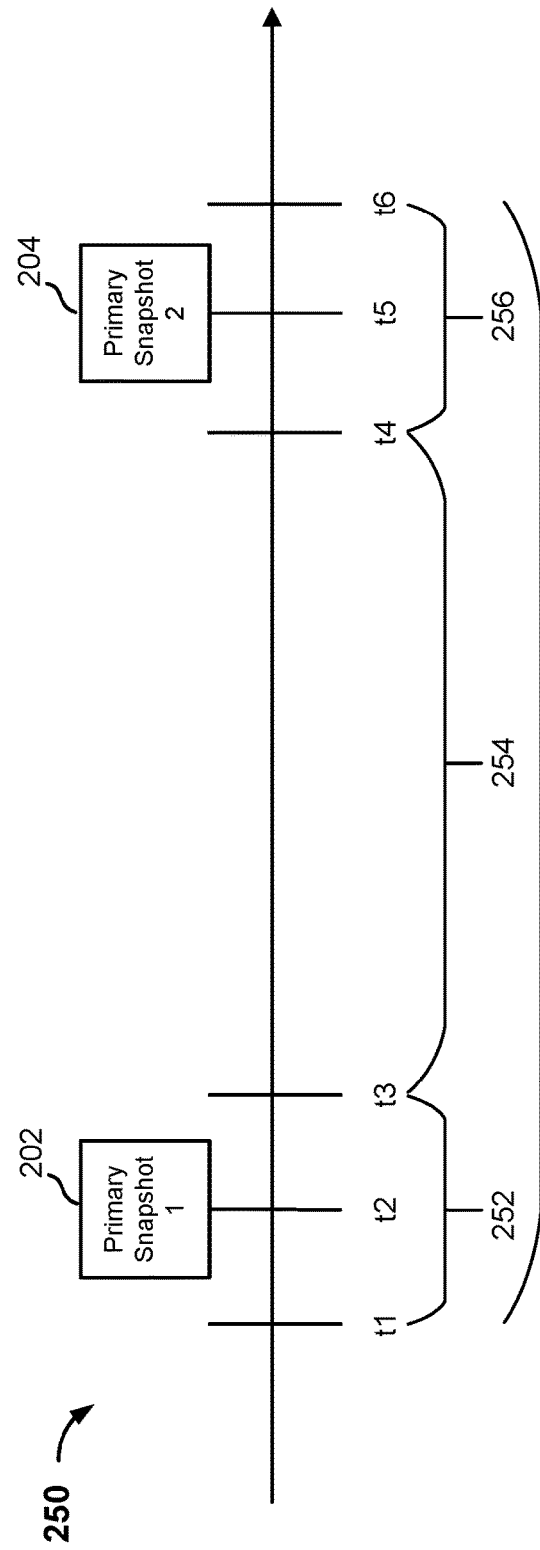

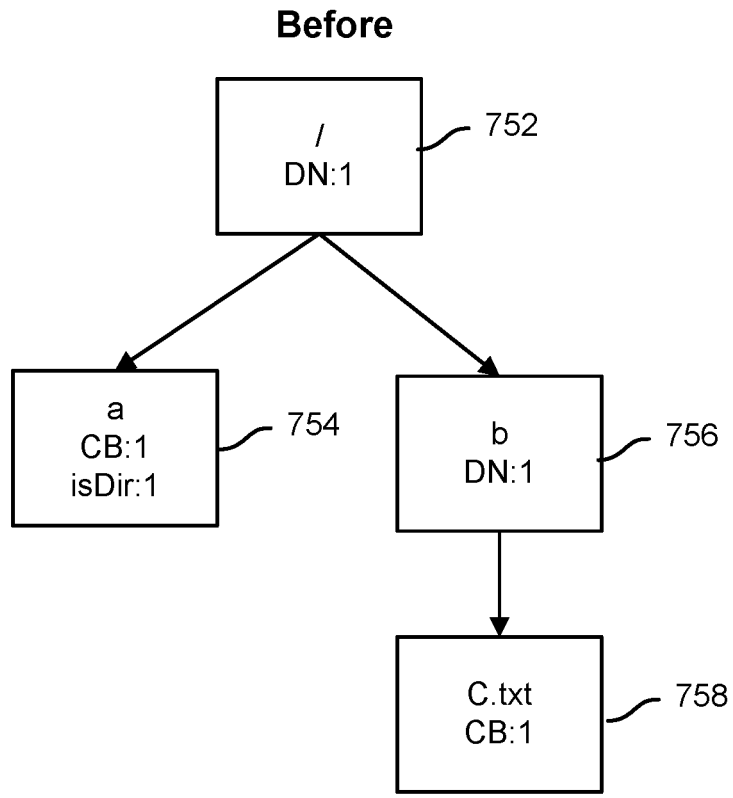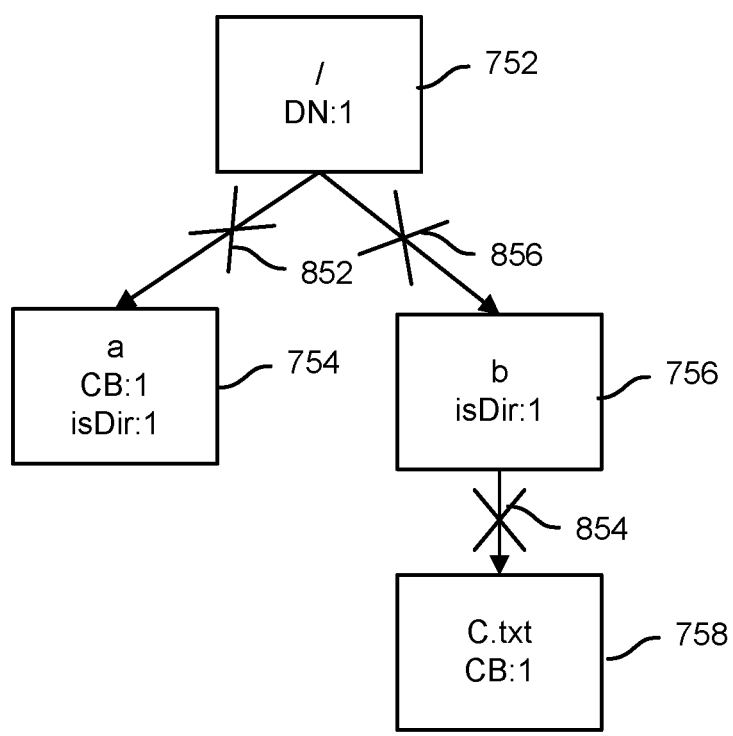
FIG. 8B

1050
Before
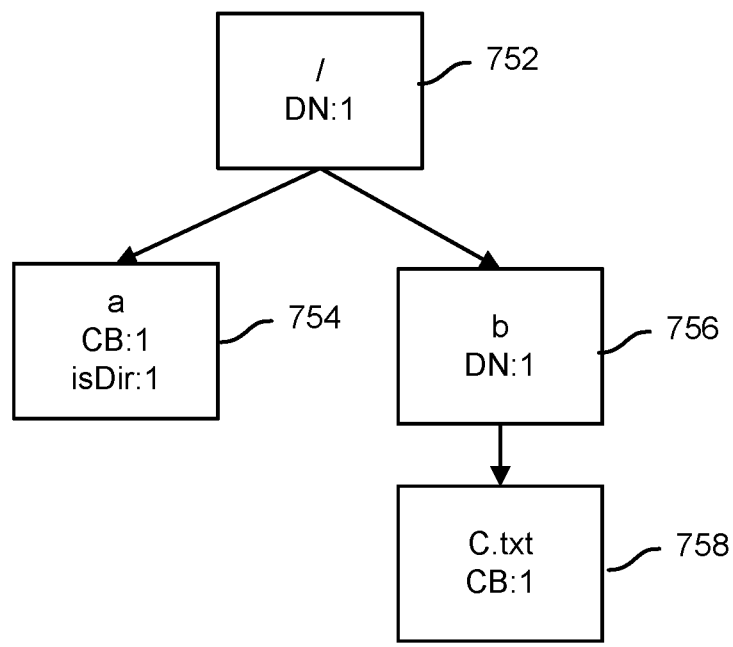
After
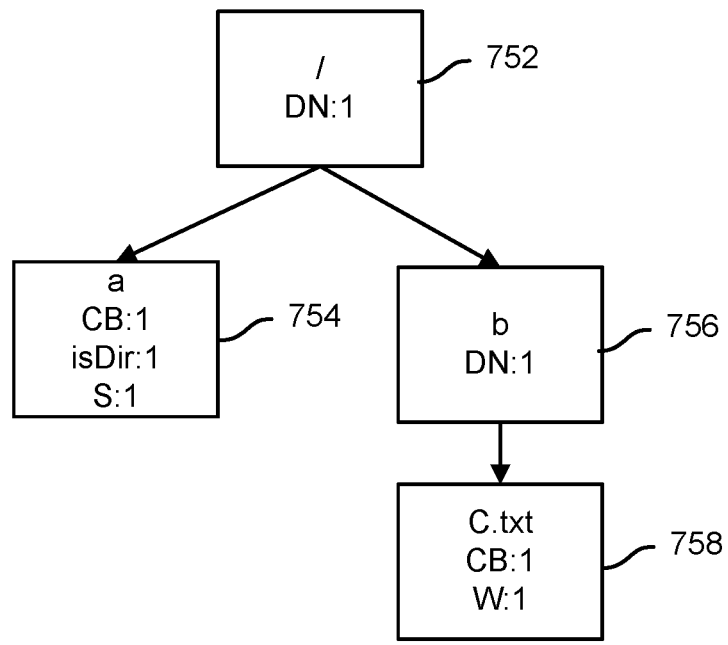
FIG. 10B

1150
Before
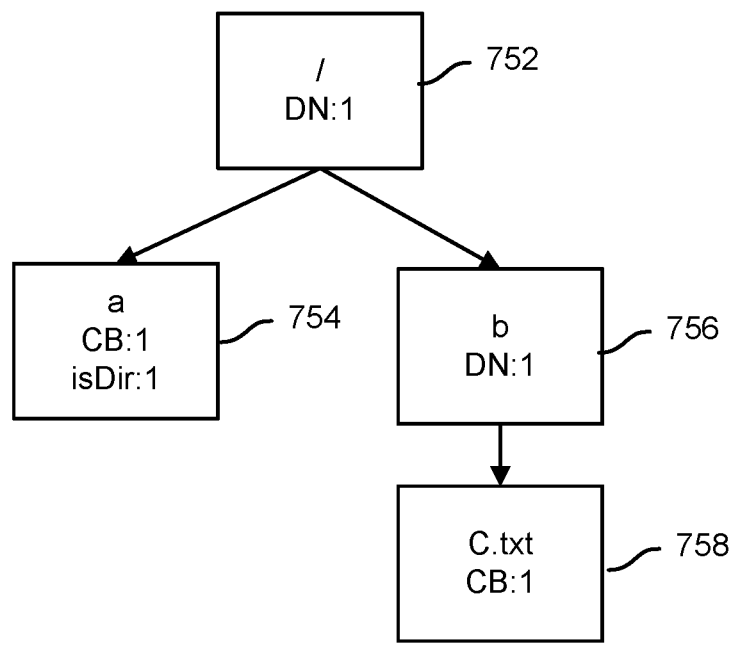
After
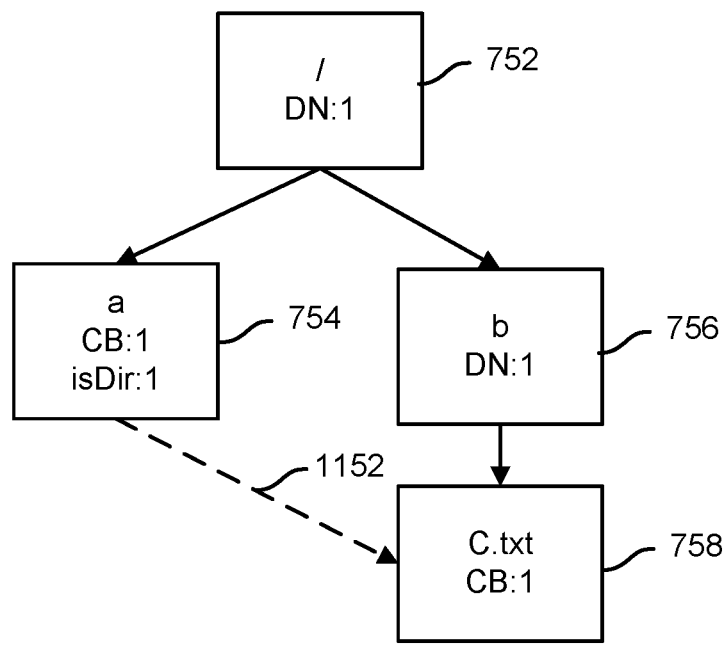
FIG. 11B

COALESCING STORAGE LOG ENTRIES

BACKGROUND OF THE INVENTION

A primary system may be comprised of one or more client devices connected to a storage system (e.g., network-attached storage (NAS)) via a network. A full or incremental backup of the storage system may be generated and data included in the backup is backed up from the storage system to a backup system. The storage system may store a large number of directories and files (e.g., millions, billions, etc.). When an incremental backup of the storage system is generated, files and/or directories that have changed (e.g., created, modified, moved and/or deleted) are identified. The changed files and/or changed directories may be identified by traversing the entire directory structure associated with the storage system. A full directory traversal inspects all the directories and files in a volume. This is a resource and time intensive process. The number of changed files and/or changed directories associated with an incremental backup may be small (e.g., less than a change threshold). In this scenario, traversing the entire directory structure associated with the storage system to identify the changed files and/or changed directories is inefficient.

BRIEF DESCRIPTION OF THE DRAWINGS

Various embodiments of the invention are disclosed in the following detailed description and the accompanying drawings.

FIG. 2A is a diagram illustrating an embodiment of a timeline associated with an incremental backup in accordance with some embodiments.

FIG. 2B is a diagram illustrating an embodiment of a timeline associated with an incremental backup in accordance with some embodiments.

FIG. 8B is a diagram illustrating a tree data structure being updated for delete object events occurring within the change tracking time window in accordance with some embodiments.

FIG. 10B is a diagram illustrating a tree data structure being updated for updating object events occurring within the change tracking time window in accordance with some embodiments.

FIG. 11B is a diagram illustrating a tree data structure being updated for a hardlink creation event occurring within the change tracking time window in accordance with some embodiments.

DETAILED DESCRIPTION

Figure 1:
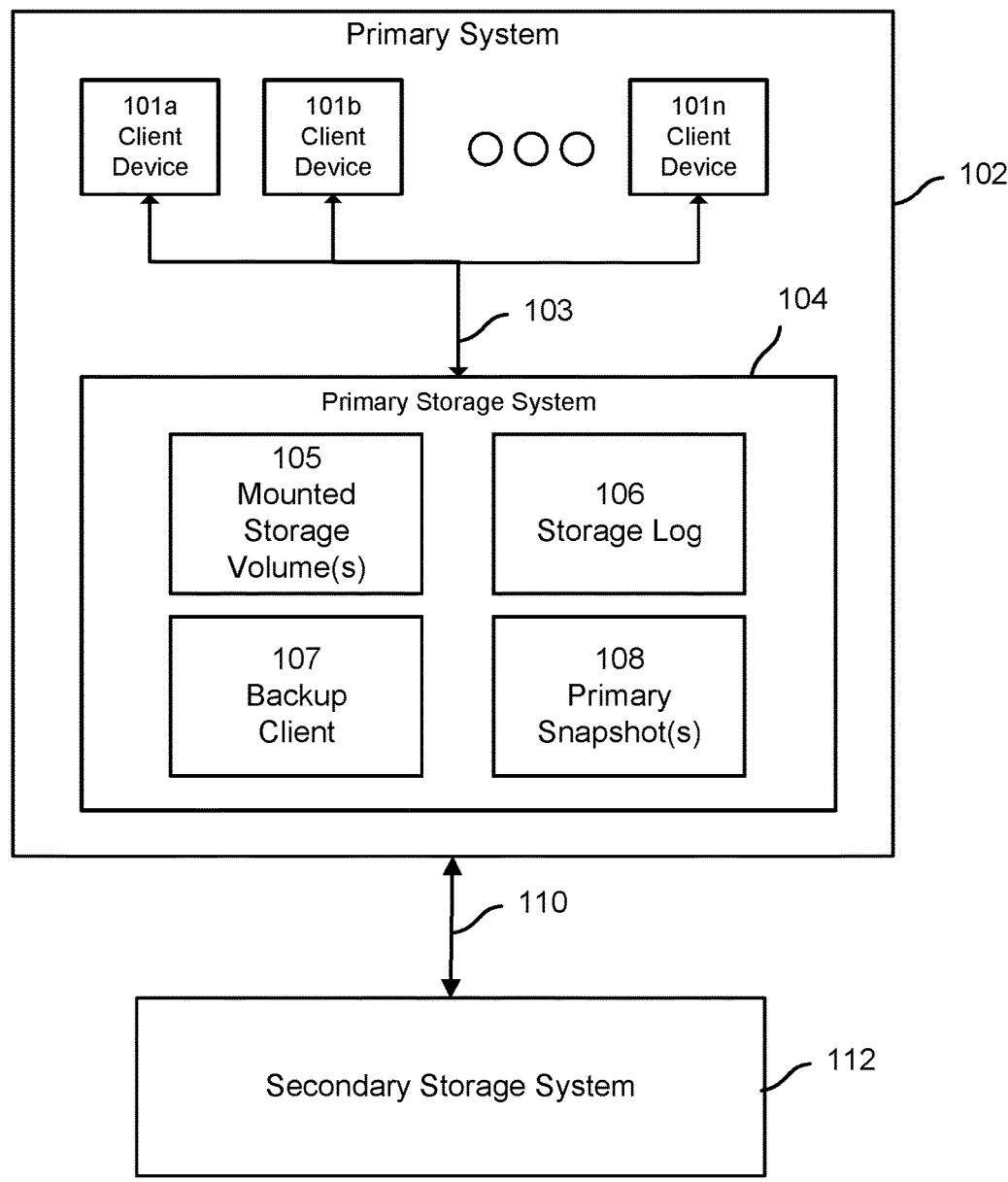
FIG. 1 is a block diagram illustrating a system for generating a backup in accordance with some embodiments.

Techniques to generate an incremental backup of a primary storage system are disclosed. The primary storage system includes a storage device (e.g., NAS device) that is configured to generate snapshots of the data stored in a storage volume of the primary storage system. A primary snapshot captures a state of a file system at a point in time. For example, the primary snapshot may be a read-only image of a storage volume of the primary storage system.

The primary storage system is configured to maintain a storage log (e.g., audit log) for compliance purposes. The primary storage system maintains and updates a storage log anytime an object (e.g., file or directory) is accessed, modified, deleted, or created. An entry in the storage log may correspond to one or more of the objects and includes information, such as a timestamp, an event type (e.g., read, write, delete, create, move, change owner, change permissions, etc.), a file path, a filename, a directory name, a directory path, a user associated with the event, a file associated with the event, an identification of a device used, an object identifier which may or may not be unique, etc. In some embodiments, an entry corresponds to a single operation for a single object (e.g., a file was created). In some embodiments, an entry corresponds to a plurality of operations for a plurality of objects (e.g., a directory and all of its subdirectories and files were deleted). Entries in the storage log may correspond to other events associated with the primary storage system, such as when a user logged in, the number of failed login attempts associated with a device, the last time a software update was performed, the last time a password was changed, etc. Events stored in the storage log are stored in chronological order or may be sorted to be in chronological order.

Instead of traversing the entire file directory structure of the primary storage system to generate an incremental backup, a selective directory traversal of the file directory structure of a primary snapshot is performed to reduce the amount of time and resources needed to generate the incremental backup. The file directory structure of the primary snapshot is traversed instead of the file directory structure of the primary storage system because the file directory structure of the primary snapshot represents the file directory structure at a particular point in time whereas the file directory structure of the primary storage system is a live directory structure that may change over time.

The storage log is analyzed to identify changed objects (e.g., a changed file, a change to metadata associated with a file, a created file, a deleted file, a moved file, a new directory, a deleted directory, a moved directory, a change to metadata associated with a directory, etc.) that are to be included in the incremental backup. The primary snapshots generated by a primary storage system, such as a NAS device, have corresponding timestamps and the events stored in the storage log have corresponding timestamps. The point in time at which a primary snapshot was performed (e.g., the capture time associated with the primary snapshot) is not reflected in the storage log. Directly comparing the timestamps in the storage log with the timestamp of the primary snapshot to identify changed objects is problematic because of possible disparities between the clocks used to generate those timestamps, which may not be well synchronized. Thus, merely including in the incremental backup identified changed objects determined by comparing the timestamps in the storage log with the timestamp of the previous primary snapshot may lead to data integrity issues because clock skew may exist between a clock associated with the primary snapshots and a clock associated with the storage log. As a result, an object may be incorrectly identified as an identified changed object and included in a backup of a current primary snapshot when in fact, the incorrectly identified changed object was already included in a previous secondary backup or should be included in a subsequent secondary backup. An object may also be accidentally excluded from a backup of a current primary snapshot because it was believed to already have been included in a previous secondary backup or is believed to be included in a subsequent secondary backup.

The disclosed techniques reduce the likelihood of data integrity issues when an incremental backup of a primary storage system is generated. A secondary storage system is configured to receive an indication of a new primary snapshot created for the primary storage system. The secondary storage system is configured to send to the primary storage system a request for the storage log associated with the primary storage system. In some embodiments, the request is for the entire storage log. In some embodiments, the request is for a portion of the storage log (e.g., the portion of the storage log since a last primary snapshot). The request may be sent periodically (e.g., hourly, daily, etc.) or on-demand. A threshold time window based on a capture time associated with the new primary snapshot is determined. In some embodiments, the time boundaries associated with a threshold time window are based on a clock associated with a storage log. In some embodiments, the time boundaries associated with a threshold time window are based on a clock associated with primary snapshots.

In some embodiments, the threshold time window boundaries include a pre-previous primary snapshot marker (e.g., t1 of FIG. 2A) and a post-new primary snapshot marker (e.g., t4 of FIG. 2A). The timestamps associated with the pre-previous primary snapshot marker and the post-new primary snapshot marker may be based on the storage log clock. The objects to include in the secondary backup of the new primary snapshot are determined by utilizing the storage log to identify objects having changes that occurred after the pre-previous primary snapshot marker and before the post-new primary snapshot marker. Directories associated with the identified objects having changes are added to a list of directories to traverse. In some embodiments, a plurality of the identified changed objects is associated with the same directory. Instead of traversing the same directory a plurality of times, the list of directories to traverse may be deduplicated to include a single entry that corresponds to the directory that is shared by a plurality of entries. In some embodiments, the entries are deduplicated in-line (e.g., while the directories are being added to the list) or after the entire list of directories to traverse is completed. The directories associated with the identified changed objects included in the new primary snapshot are traversed to verify that the identified changed objects are to be included in the secondary backup of the primary storage system. This may prevent data corruption issues when performing the secondary backup. In some embodiments, the identified changed object is a directory and a top level of the directory is traversed. In some embodiments, the identified changed object is a file and a directory that includes the file is traversed. This may include a top level directory that includes the file and one or more sub-levels.

For example, based on comparing the timestamp of the new primary snapshot and the timestamp of the storage log, an event in the storage log may indicate that an object, such as a file or directory, was created at a particular point in time that occurred after a capture time associated with a previous primary snapshot (e.g., primary snapshot 202 of FIGS. 2A, 2B). However, due to possible discrepancies between the snapshot service clock and the storage log clock, it is not clear if the event is associated with the new primary snapshot. A directory associated with the created object included in the new primary snapshot (e.g., primary snapshot 204 of FIGS. 2A, 2B) may be traversed to verify that the created object is present in the new primary snapshot. In some embodiments, the created object is a directory and a top level of the directory is traversed. In some embodiments, the created object is a file and a top level of the directory that includes the file is traversed. If the object is not included in the directory (e.g., the top level of the directory does not exist or the file does not exist) and there are no other entries related to that object in the storage log, then the new primary snapshot was generated before the event (e.g., the event occurred after t3 of FIG. 2A or after t5 of FIG. 2B) and the new object is not included in the secondary backup of the primary storage system. If the created object is included in the directory (e.g., the top level of the directory exists or the file exists in the directory) and there are no other entries related to that object in the storage log, then the new primary snapshot was generated after the event (e.g., the event occurred before t3 of FIG. 2A or before t5 of FIG. 2B).

However, it is not clear if the object was created before the previous primary snapshot (e.g., between t1 and t2 of FIGS. 2A, 2B) or after the previous primary snapshot (e.g., between t2 and t3 of FIG. 2A or between t2 and t5 of 2B). That is, it is not clear if the object should be included in the secondary backup. A secondary backup corresponding to the previous primary snapshot may be analyzed to determine if the object was created before the previous primary snapshot or after the previous primary snapshot. If the created object is included in the secondary backup corresponding to the previous primary snapshot and there are no other delete, move, or create entries associated with the object in the storage log, then the object was created before the previous primary snapshot and should not be included in a secondary backup of the new primary snapshot. If the created object is not included in the secondary backup corresponding to the previous primary snapshot, then the object was created after the previous primary snapshot and should be included in the secondary backup of the new primary snapshot.

In another example, based on comparing the timestamp of the new primary snapshot and the timestamp of the storage log, an event in the storage log may indicate that an object was deleted at a particular point in time that occurred after a capture time associated with a previous primary snapshot. A directory associated with the object included in the new primary snapshot may be traversed (i.e., either the directory itself or the directory of a file) to verify that the object is not present in the new primary snapshot. If the object is included in the directory, then the new primary snapshot was generated before the event (e.g., the object was deleted after t3 of FIG. 2A, deleted after t5 of FIG. 2B, or deleted before t2 of FIGS. 2A, 2B so long as there are not subsequent create operations for an object having the same name as the deleted object) and a changed object indicating the object deletion would not be included in a change list corresponding to the secondary backup of the new primary snapshot. If the object is not included in the directory, then the new primary snapshot was generated after the event (e.g., the object was deleted before t3 of FIG. 2A or t5 of FIG. 2B).

However, it is unclear if the object was deleted before or after the previous primary snapshot (e.g., before or after t2 of FIGS. 2A, 2B). A secondary backup corresponding to the previous primary snapshot may be analyzed to determine if the object was deleted before the previous primary snapshot or after the previous primary snapshot. If the deleted object is included in the secondary backup corresponding to the previous primary snapshot, then the object was deleted after the previous primary snapshot and the identified changed object should be included in a change list corresponding to a secondary backup of the new primary snapshot. If the deleted object is not included in the secondary backup corresponding to the previous primary snapshot, then the object was deleted before the previous primary snapshot and the identified changed object should not be included in the change list corresponding to the secondary backup of the new primary snapshot.

The verified changed objects are aggregated in a change list. The change list indicates the objects and one or more corresponding operations to perform with respect to previously backed up versions of the objects or one or more corresponding operations to perform with respect to a new version of an object. An operation may be to create the object, delete the object, move the object, and/or modify the object (e.g., data and/or metadata). The objects included in the change list that are associated with create or modify data operations are obtained and included in a secondary backup of the new primary snapshot to generate an incremental backup of the primary storage system. In some embodiments, a file is included in the change list and the file is obtained. In some embodiments, a directory is included in the change list and files included in the top level of the directory are obtained. Objects included in the change list that are associated with delete or move operations are not obtained, but an indication of the delete or move operations is stored. The secondary storage system may use the indication to update its own metadata that represents a state of the primary storage system at a point in time corresponding to the new primary snapshot. Objects included in the change list that are associated with modify modified metadata operations are not obtained, but an indication of the modified metadata operation is stored. The modified metadata is obtained for the object at a later point in time.

A secondary storage system is configured to request for the changed objects included in the change list that are associated with create or modify data operations. In response to the request, the primary storage system is configured to provide data and metadata associated with the requested changed objects. The secondary storage system is configured to back up and ingest the data and metadata included in the secondary backup and store the backed up data and metadata. Selectively traversing the file directory structure reduces the amount of time and resources needed to generate the incremental backup. Using the threshold time window to identify changed objects to include in the incremental backup reduces data integrity issues that may arise when generating an incremental backup.

In some embodiments, the amount of time and resources needed to generate the incremental backup is further reduced by selectively traversing the file directory structures for objects having changes that occurred near the previous primary snapshot (e.g., within a first threshold time window (t1 to t3 of FIG. 2B)) and objects having changes that occurred near the new primary snapshot (e.g., within a second threshold time window (t4 to t6 of FIG. 2B)). Directories associated with the objects having changes that occurred between the first threshold time window and the second threshold time window (e.g., t3 to t4 of FIG. 2B) do not need to be traversed because the clock skew between a snapshot service clock and storage log clock is unlikely to be great enough to cause a data integrity problem for these changed objects. The objects having changes that occurred between the first threshold time window and the second threshold time window have a high confidence level (e.g., confidence level greater than a threshold confidence level) that they are to be included in a secondary backup of the new primary snapshot.

The first threshold time window boundaries include a pre-previous primary snapshot marker (e.g., t1 of FIG. 2B) and a post-previous primary snapshot marker (e.g., t3 of FIG. 2B). In an example, the capture time associated with the previous primary snapshot may be 12:00 AM (e.g., generated by a snapshot service clock). The pre-previous primary snapshot marker may be 11:58 PM and the post-previous primary snapshot marker may be 12:02 AM. The timestamps associated with the pre-previous primary snapshot marker and the post-previous primary snapshot marker may be based on a storage log clock.

The second threshold time window boundaries include a pre-new primary snapshot marker (e.g., t4 of FIG. 2B) and a post-new primary snapshot marker (e.g., t6 of FIG. 2B). Continuing the above example, the capture time associated with the new primary snapshot may be 12:00 PM (e.g., generated by a snapshot service clock). The pre-new primary snapshot marker may be 11:58 AM and the post-new primary snapshot marker may be 12:02 PM. The timestamps associated with the pre-new primary snapshot marker and the post-new primary snapshot marker may be based on the storage log clock.

The storage log is analyzed to identify events that occurred in the first threshold time window and the second threshold time window. The identified events correspond to changed objects that may be associated with a new primary snapshot, a previous primary snapshot, or a subsequent primary snapshot. Directories associated with the identified changed objects are added to a list of directories to traverse. In some embodiments, a plurality of the identified changed objects is associated with the same directory. Instead of traversing the same directory a plurality of times, the list of directories to traverse may be deduplicated to include a single entry that corresponds to the directory that is shared by a plurality of entries. In some embodiments, the entries are deduplicated in-line (e.g., while the directories are being added to the list) or after the entire list of directories to traverse is completed. The directories associated with the changed objects corresponding to the identified events are traversed to determine whether each of the changed objects is associated with the new primary snapshot, the previous primary snapshot, or the subsequent primary snapshot. This may prevent data corruption issues when performing the secondary backup. In some embodiments, the identified changed object is a directory and a top level of the directory is traversed. In some embodiments, the identified changed object is a file and a directory that includes the file is traversed. Directories associated with changed objects included in the first threshold time window or second threshold time window are traversed because the clock skew between the snapshot service clock and storage log clock may cause a data integrity problem, that is, changed objects included in the first threshold time window or second threshold time window cannot be determined to be included in the new primary snapshot with a high confidence level (e.g., confidence level greater than a threshold confidence level) by using the timestamps of the different clocks. Changed objects that are determined to be associated with the new primary snapshot are added to a change list. The objects included in the change list that are associated with create or modify data operations are obtained and included in an incremental backup of the primary storage system.

The storage log is further analyzed to identify events that occurred in a change tracking time window (e.g., a period of time between the first and second threshold time windows). The identified events correspond to changed objects that are likely to have been captured by the new primary snapshot. Unlike changed objects included in the first and second threshold time windows, directories associated with changed objects corresponding to the identified events that occurred between the first and second threshold time windows do not need to be traversed because the clock skew between the snapshot service clock and storage log clock is unlikely to be great enough to cause a data integrity problem.

The changed objects are aggregated in the change list. As discussed above, the change list indicates the objects and one or more corresponding operations to perform with respect to previously backed up versions of the objects or one or more corresponding operations to perform with respect to a new version of an object. In some embodiments, the storage log may store for an object a plurality of entries that occurred within the change tracking time window.

A secondary backup of the new primary snapshot reflects the changed objects that are included in a change list. The secondary storage system is configured to perform each of the corresponding operations included in the change list. However, performing all of the operations associated with a particular changed object may waste the secondary storage system's resources (processing, storage, network, etc.). For example, the storage log may indicate that in the change tracking time window an object was created, moved to a different location in the filesystem, modified, and then deleted. Using the secondary storage system's resources to perform all of these operations is a waste of resources because the end result is a deleted file. In another example, the storage log may indicate that in the change tracking time window an object was moved ten times to ten different directories. Using the secondary storage system's resources to perform each of the move operations is a waste of resources because moving the object from its original directory to its final directory would accomplish the same end result while using less resources.

Using the techniques disclosed herein, the resources needed by the secondary storage system to generate an incremental backup may be reduced by coalescing changes identified in the entries of the storage log occurring within the change tracking time window into a change tracking result set. The secondary storage system is configured to generate the change tracking result set by creating a tree data structure that represents object events occurring within the change tracking time window.

The tree data structure partially represents the file directory structure of the primary snapshot. The tree data structure is comprised of a plurality of nodes that correspond to nodes of the file directory structure of the primary snapshot. A node included in the tree structure corresponds to an object having one or more events that occurred within the change tracking time window or an object needed to traverse from a root node of the file directory structure of the primary snapshot to the object having one or more events that occurred within the change tracking time window.

The events associated with storage log entries that occurred during the change tracking time window are processed in chronological order and the tree data structure is updated to reflect the process of events associated with the storage log entries. The tree data structure is in an intermediate state until all of the storage log entries that occurred during the change tracking time window are processed. The tree data structure reaches a finalized state after all of the storage log entries that occurred during the change tracking time window are processed. The finalized state of the tree data structure enables a plurality of operations associated with an object to be coalesced into a reduced number of operations (e.g., one or two operations).

The change tracking result set includes one or more entries for one or more changed objects. The one or more changed objects included in the change tracking result set are added to the change list. In some embodiments, a changed object is associated with a single operation that occurred during the change tracking time window. The entry corresponding to the changed object includes the single operation. In some embodiments, a changed object is associated with a plurality of operations that occurred during the change tracking time window. The change tracking result set may store a reduced number of entries (e.g., one or two) for the changed object.

In some embodiments, a changed object is included in the change tracking result set and also associated with an event that occurred during the first threshold time window or the second threshold time window. Such objects are removed from the change tracking result set because it is unclear whether such objects need to be backed up. For example, an object may have been created during the change tracking time window but deleted during the second threshold time window (e.g., between t4 and t6 of FIG. 2B). A selective traversal of the file directory structure will verify whether or not the changed object is to be included in the secondary backup of the primary storage system.

A secondary storage system is configured to request for the changed objects included in the change list that are associated with create or modify data operations. In response to the request, the primary storage system is configured to provide data and metadata associated with the requested changed objects. The secondary storage system is configured to back up and ingest the data and metadata included in the secondary backup and store the backed up data and metadata.

FIG. 1 is a block diagram illustrating a system for generating a backup in accordance with some embodiments.

In the example shown, system 100 is comprised of primary system 102, network 110, and secondary storage system 112.

Primary system 102 may be comprised of a plurality of client devices 101a, 101b, 101n, a network 103, and a primary storage system 104. Although three client devices are shown, primary system 102 may be comprised of one to n client devices. A client device may be a computing device, such as a computer, a laptop, a desktop, a tablet, a mobile device, etc. Client devices 101a, 101b, 101n may store one or more objects to primary storage system 104. Client devices 101a, 101b, 101n may access the one or more objects stored in primary storage system 104 and perform one or more file operations with respect to the one or more objects stored in primary storage system 104. A file operation may include a write operation, a read operation, a delete operation, a move operation, a creation operation, a modify metadata operation (e.g., change permissions, change ownership, etc.) etc. In some embodiments, the one or more file operations include creating a directory, deleting a directory, modifying a directory, or moving a directory, etc.

Client devices 101a, 101b, 101n may be connected to primary storage system 104 via network 103. Network 103 may be a local area network, a wide area network, a personal area network, a wireless local area network, a storage-area network, etc.

Primary storage system 104 may be comprised of one or more data storage servers (not shown). Primary storage system 104 may be configured to provide file-based data storage services to client devices 101a, 101b, 101n. For example, primary storage system 104 may be a NAS. Primary storage system 104 may include one or more mounted storage volumes 105, storage log 106 (e.g., compliance audit log), and backup client 107. The one or more mounted storage volumes 105 may store the data associated with one or more files, the metadata associated with the one or more files, data associated with one or more directories, and metadata associated with one or more directories. Storage log 106 may include a plurality of entries for the one or more mounted storage volumes 105. An entry may identify the mounted storage volume to which the entry is associated. Storage log 106 may include an entry each time an object stored in the one or more mounted storage volumes 105 is accessed, modified, moved, created, or deleted. Each entry of storage log 106 may include an associated timestamp. Primary storage system 104 may maintain a corresponding storage log for each storage device of primary storage system 104. Storage log 06 may be divided into a plurality of files. For example, the first n logs may be stored in a first file, the second n logs may be stored in a second file, . . . , and the nth n logs may be stored in an nth file.

Storage log 106 may associate an object with a path (e.g., file path, directory path) and a name (e.g., filename, directory name), but not a unique identifier. When there are multiple events associated with an object, it may be difficult to determine whether a plurality of changes associated with an object are associated with the same object or with different objects. For example, an object having a first name may be created, deleted, and then a second object having the same name may be created.

Primary storage system 104 may be configured to generate and store one or more primary snapshots 108 of the data stored in a storage volume. In some embodiments, one of the primary snapshots 108 is deleted after a secondary backup of the primary snapshot 108 is performed. Primary snapshots 108 may be generated according to a backup policy. In some embodiments, a primary snapshot is generated periodically (e.g., hourly, bi-daily, daily, etc.). A primary snapshot is a read-only image of a storage volume of the primary storage system that captures the state of the file system at a point in time.

In some embodiments, secondary storage system 112 remotely accesses storage log 106 and requests data from primary storage system 104 in order to perform a secondary backup based on the entries included in storage log 106. Secondary storage system 112 may use a distributed file system protocol (e.g., network file system) to remotely access primary system 102 and its contents (e.g., one or more mounted storage volumes 105, storage log 106, primary snapshot(s) 108, etc.). In some embodiments, backup client 107 detects that primary snapshot 108 was generated, accesses storage log 106, and performs a secondary backup of primary snapshot 108 based on the entries included in storage log 106. In some embodiments, backup client 107 receives a command from secondary storage system 112 to perform a secondary backup of primary snapshot 108. In response to the command, backup client 107 accesses storage log 106 and performs a secondary backup of primary snapshot 108 based on the entries included in storage log 106. In some embodiments, secondary storage system 112 accesses primary system 102 via a proxy (not shown).

The secondary backup may be a full backup of primary snapshot 108 or an incremental backup of primary snapshot 108. A full backup of primary snapshot 108 includes all of the data associated with primary snapshot 108. An incremental backup of primary snapshot 108 includes data associated with primary snapshot 108 that was not previously backed up to secondary storage system 112. In some embodiments, all of the data associated with an object included in the change list is backed up to secondary storage system 112. In some embodiments, data and metadata associated with the object included in the change list that were not previously included in a secondary backup are backed up to secondary storage system 112.

To generate an incremental backup, a selective directory traversal of the file directory structure associated with primary snapshot 108 is performed to reduce the amount of time and resources needed to generate the incremental backup. Storage log 106 is analyzed to identify changed objects (e.g., a changed file, a change to metadata associated with a file, a created file, a deleted file, a moved file, a new directory, a deleted directory, a moved directory, etc.) that are to be included in the incremental backup. The primary snapshots 108 generated by primary storage system 104 have corresponding timestamps and the events stored in storage log 106 have corresponding timestamps. The point in time at which a primary snapshot was performed is not reflected in storage log 106. Directly comparing the timestamps in the storage log with the timestamp of the primary snapshot to identify changed objects is problematic because of possible disparities between the clocks used to generate those timestamps, which may not be well synchronized. Thus, merely including in the incremental backup identified changed objects determined by comparing the timestamps in storage log 106 with the timestamp of the previous primary snapshot may lead to data integrity issues because clock skew may exist between a clock associated with the primary snapshots and a clock associated with storage log 106. As a result, an object may be incorrectly identified as an identified changed data object and included in a backup of a current primary snapshot when in fact, the identified changed object was already included in a previous secondary backup or should be included in a subsequent secondary backup. An object may also be accidentally excluded from a backup of a current primary snapshot because it was believed to already have been included in a previous secondary backup or is believed to be included in a subsequent secondary backup.

In some embodiments, secondary storage system 112 requests primary storage system 104 to create a new primary snapshot. In some embodiments, primary storage system 104 creates the new primary snapshot without a request from secondary storage system 112. Secondary storage system 112 is configured to receive an indication of a new primary snapshot created for primary storage system 104. Secondary storage system 112 is configured to send to primary storage system 104 a request for storage log 106. The request may be sent periodically (e.g., hourly, daily, etc.) or on-demand. In some embodiments, secondary storage system 112 accesses a storage location of storage log 106 and mounts storage log 106. A threshold time window based on a capture time associated with the new primary snapshot is determined. In some embodiments, primary storage system 104 streams events included in storage log 106 to secondary storage system 112.

In some embodiments, the threshold time window boundaries include a pre-previous primary snapshot marker (e.g., t1 of FIG. 2A) and a post-new primary snapshot marker (e.g., t4 of FIG. 2A). The timestamps associated with the pre-previous primary snapshot marker and the post-new primary snapshot marker are based on the storage log clock. The changed objects to include in the secondary backup of the new primary snapshot are determined by utilizing storage log 106 to identify objects having changes that occurred after the pre-previous primary snapshot marker and before the post-new primary snapshot marker. Directories associated with the identified changed objects are added to a list of directories to traverse. In some embodiments, a plurality of the identified changed objects is associated with the same directory. Instead of traversing the same directory a plurality of times, the list of directories to traverse may be deduplicated to include a single entry that corresponds to the directory that is shared by a plurality of entries. In some embodiments, the entries are deduplicated in-line (e.g., while the directories are being added to the list), after the entire list of directories to traverse is completed, or a combination thereof. The directories associated with the identified changed objects included in the new primary snapshot are traversed to verify that the identified changed objects are to be included in the secondary backup of the primary storage system. In some embodiments, the identified changed object is a directory and a top level of the directory is traversed. In some embodiments, the identified changed object is a file and a directory that includes the file is traversed.

The verified changed objects are aggregated in a change list. The change list indicates the objects and one or more corresponding operations to perform with respect to previously backed up versions of the objects or one or more corresponding operations to perform with respect to a new version of an object. Examples of operations may include creating the object, deleting the object, moving the object, and/or modifying the object (e.g., data and/or metadata). The objects included in the change list that are associated with create or modify data operations are obtained as required and included in a secondary backup of the new primary snapshot to generate an incremental backup of the primary storage system 104. Objects included in the change list that are associated with delete or move operations are not obtained, but an indication of the delete or move operations is stored. The secondary storage system may use the indication to update its own metadata that represents a state of the primary storage system at a point in time corresponding to the new primary snapshot.

Secondary storage system 112 is configured to back up and ingest, via connection 110, the data included in the secondary backup and store the backed up data. Connection 110 may be a wired connection or a wireless connection. Connection 110 may be a LAN, WAN, intranet, the Internet, or a combination thereof. Selectively traversing the file directory structure reduces the amount of time and resources needed to generate the incremental backup. Using the threshold time window to identify changed objects to include in the incremental backup reduces data integrity issues that may arise when generating an incremental backup.

In some embodiments, the amount of time and resources needed to generate the incremental backup is further reduced by selectively traversing the file directory structures for objects having changes that occurred near the previous primary snapshot (e.g., within a first threshold time window) and objects having changes that occurred near the new primary snapshot (e.g., within a second threshold time window). Directories associated with the objects having changes that occurred between the first threshold time window and the second threshold time window may not need to be traversed because the clock skew between the snapshot service clock and storage log clock is unlikely to be great enough to cause a data integrity problem for these changed objects. The objects having changes that occurred between the first threshold time window and the second threshold time window have a high confidence level (e.g., confidence level greater than a threshold confidence level) that they are to be included in a secondary backup of the new primary snapshot.

The first threshold time window boundaries include a pre-previous primary snapshot marker (e.g., t1 of FIG. 2B) and a post-previous primary snapshot marker (e.g., t3 of FIG. 2B). In an example, the capture time associated with the previous primary snapshot may be 12:00 AM (e.g., generated by a snapshot service clock). The pre-previous primary snapshot marker may be 11:58 PM and the post-previous primary snapshot marker may be 12:02 AM. The timestamps associated with the pre-previous primary snapshot marker and the post-previous primary snapshot marker may be based on a storage log clock.

The second threshold time window boundaries include a pre-new primary snapshot marker (e.g., t4 of FIG. 2B) and a post-new primary snapshot marker (e.g., t6 of FIG. 2B). Continuing the above example, the capture time associated with the new primary snapshot may be 12:00 PM (e.g., generated by a snapshot service clock). The pre-new primary snapshot marker may be 11:58 AM and the post-new primary snapshot marker may be 12:02 PM. The timestamps associated with the pre-new primary snapshot marker and the post-new primary snapshot marker may be based on the storage log clock.

Storage log 106 is analyzed to identify events that occurred in the first threshold time window and the second threshold time window. The identified events correspond to changed objects that may be associated with a new primary snapshot, a previous primary snapshot, or a subsequent primary snapshot. Directories associated with the identified changed objects are added to a list of directories to traverse. In some embodiments, a plurality of the identified changed objects is associated with the same directory. Instead of traversing the same directory a plurality of times, the list of directories to traverse may be deduplicated to include a single entry that corresponds to the directory that is shared by a plurality of entries. In some embodiments, the entries are deduplicated in-line (e.g., while the directories are being added to the list) or after the entire list of directories to traverse is completed. The directories associated with the changed objects corresponding to the identified events are traversed to determine whether each of the changed objects is associated with the new primary snapshot, the previous primary snapshot, or the subsequent primary snapshot. In some embodiments, the identified changed object is a directory and a top level of the directory is traversed. In some embodiments, the identified changed object is a file and a directory that includes the file is traversed. Directories associated with changed objects included in the first threshold time window or second threshold time window are traversed because the clock skew between the snapshot service clock and storage log clock may cause a data integrity problem, that is, changed objects included in the first threshold time window or second threshold time window cannot be determined to be included in the new primary snapshot with a high confidence level (e.g., confidence level greater than a threshold confidence level) by using the timestamps of the different clocks. Changed objects that are determined to be associated with the new primary snapshot are added to a change list. The objects included in the change list that are associated with create or modify data operations are obtained and included in an incremental backup of the primary storage system 104.

Storage log 106 is further analyzed to identify events that occurred in a change tracking time window (e.g., a period of time between the first and second threshold time windows). The identified events correspond to changed objects that are likely to have been captured by the new primary snapshot. Unlike changed objects included in the first and second threshold time windows, directories associated with changed objects corresponding to the identified events that occurred between the first and second threshold time windows do not need to be traversed because the clock skew between the snapshot service clock and storage log clock is unlikely to be great enough to cause a data integrity problem.

The changed objects are aggregated in the change list. As discussed above, the change list indicates the objects and one or more corresponding operations to perform with respect to previously backed up versions of the objects or one or more corresponding operations to perform with respect to a new version of an object. In some embodiments, storage log 106 may store for an object a plurality of entries that occurred within the change tracking time window.

A secondary backup of the new primary snapshot reflects the changed objects that are included in a change list. Secondary storage system 112 is configured to request for the changed objects included in the change list that are associated with create or modify data operations. However, performing all of the operations associated with a particular changed object may waste resources (processing, storage, network, etc.) associated with secondary storage system 112. For example, storage log 106 may indicate that in the change tracking time window an object was created, moved to a different location in the filesystem, modified, and then deleted. Using the resources of secondary storage system 112 to perform all of those operations is a waste of resources because the end result is a deleted file. In another example, storage log 106 may indicate that in the change tracking time window an object was moved to ten different directories. Using the resources of secondary storage system 112 to perform each of the move operations is a waste of resources because moving the object from its original directory to its final directory would accomplish the same end result while using less resources.

The resources needed by secondary storage system 112 to generate an incremental backup may be reduced by coalescing changes identified in the entries of storage log 106 occurring within the change tracking time window into a change tracking result set. Secondary storage system 112 is configured to generate the change tracking result set by creating a tree data structure that represents object events occurring within the change tracking time window.

The events associated with storage log entries that occurred during the change tracking time window are processed in chronological order and the tree data structure is updated to reflect the process of events associated with the storage log entries. The tree data structure is in an intermediate state until all of the storage log entries that occurred during the change tracking time window are processed. The tree data structure reaches a finalized state after all of the storage log entries that occurred during the change tracking time window are processed. The finalized state of the tree data structure enables a plurality of operations associated with an object to be coalesced into a reduced number of operations (e.g., one or two operations).

The change tracking result set includes one or more entries for one or more changed objects. The one or more objects included in the change tracking result set are added to the change list. In some embodiments, a changed object is associated with a single operation that occurred during the change tracking time window. The entry corresponding to the changed object includes the single operation. In some embodiments, a changed object is associated with a plurality of operations that occurred during the change tracking time window. The change tracking result set may store a reduced number of entries (e.g., one or two) for the changed object.

In some embodiments, a changed object is included in the change tracking result set and is also associated with an event that occurred during the first threshold time window or the second threshold time window. Such objects are removed from the change tracking result set because a selective directory traversal of a directory that includes the object or the object itself (e.g., the object is a directory) is to be performed. This reduces the resources used by secondary storage system 112 to process the object for the incremental backup. For example, an object may have been created during the change tracking time window (e.g., between t3 and t4 of FIG. 2B) but deleted during the second threshold time window (e.g., between t4 and t6 of FIG. 2B). A selective traversal of the file directory structure will verify whether or not the changed object is to be included in the secondary backup of the primary storage system. Backing up the object and then subsequently deleting the object would be a waste of secondary storage system 112's resources. In another example, an object may have been created during the first threshold time window (e.g., between t1 and t3 of FIG. 2B) and metadata associated with the object may have been modified during the change tracking time window (e.g., between t3 and t4 of FIG. 2B). A selective directory traversal of a directory associated with the object is to be performed and an entry indicating metadata associated with the object has been modified is removed from the change tracking result set because the modified metadata associated with the object is captured during the selective directory traversal of the directory associated with the object. As a result, the entry is no longer needed and is removed. The selective directory traversal may indicate that the file was created between t1 and t2 and captured by the previous primary snapshot (e.g., primary snapshot 202 of FIG. 2B). In this example, the created object does not need to be backed up, but an indication of the modified metadata operation is stored. The modified metadata is obtained for the object at a later point in time (e.g., as a background process). However, in the event the created object was created between t2 and t3, then the created object needs to be backed up and the modified metadata would be captured as part of a backup of the object.

Secondary storage system 112 is configured to request for the changed objects included in the change list that are associated with create or modify data operations. In response to the request, primary storage system 104 is configured to provide data and metadata associated with the requested changed objects or provide access to the objects. Secondary storage system 112 is configured to back up and ingest the data included in the secondary backup and store the backed up data.

Secondary storage system 112 may be comprised of one or more storage nodes. In some embodiments, a node of secondary storage system 112 includes a processor, memory, and a plurality of storage devices. The plurality of storage devices may include one or more solid state drives, one or more hard disk drives, or a combination thereof. The backed up data may be stored in the one or more solid state drives, one or more hard disk drives, or a combination thereof.

In some embodiments, a node of secondary storage system 112 includes a processor and memory, and is coupled to a separate storage device. The separate storage device may include one or more storage devices (e.g., flash storage devices). A storage device may be segmented into a plurality of partitions. Each of the nodes may be allocated one or more of the partitions. The one or more partitions allocated to a node may be configured to store data associated with some or all of the changed objects that were backed up to secondary storage system 112. For example, the separate storage device may be segmented into 10 partitions and secondary storage system 112 may include 10 nodes. A node of the 10 nodes may be allocated one of the 10 partitions.

In some embodiments, a node of secondary storage system 112 includes a processor, memory, and a storage device. The node may be coupled to a separate storage device. The separate storage device may include one or more storage devices. A storage device may be segmented into a plurality of partitions. Each of the nodes may be allocated one or more of the partitions. The one or more partitions allocated to a node may be configured to store data associated with some or all of the changed objects that were backed up to secondary storage system 112. For example, the separate storage device may be segmented into 10 partitions and storage cluster secondary storage system 112 may include 10 nodes. A node of the 10 nodes may be allocated one of the 10 partitions.

In some embodiments, the nodes are homogenous nodes where each node has the same capabilities (e.g., processing, storage, memory, etc.). In some embodiments, at least one of the nodes is a heterogeneous node with different capabilities (e.g., processing, storage, memory, etc.) than the other nodes of secondary storage system 112.

FIG. 2A is a diagram illustrating an embodiment of a timeline associated with an incremental backup in accordance with some embodiments. In the example shown, timeline 200 illustrates a first primary snapshot 202 being taken at time t2 and a second primary snapshot 204 being taken at time t3.

A storage log associated with a primary storage system may be utilized to generate an incremental backup of the primary storage system. An incremental backup of the primary storage system includes objects that have changed since a previous backup (full or incremental). Other systems may traverse an entire file directory structure to identify changed objects to include in the incremental backup. However, this is a time and resource intensive process. The amount of time and resources needed to identify the changed objects to include in the incremental backup may be reduced by performing a selective file directory traversal associated with the identified changed items.

The primary storage system includes a service that is configured to generate primary snapshots. The snapshot service is associated with a corresponding clock. A capture time associated with the first primary snapshot (t2) and a capture time associated with the second primary snapshot (t3) are based on the snapshot service clock. The point in time at which a primary snapshot was performed (e.g., the capture time associated with the primary snapshot) is not reflected in the storage log. Directly comparing the timestamps in the storage log with the timestamp of the primary snapshot to identify changed objects is problematic because of possible disparities between the clocks used to generate those timestamps, which may not be well synchronized. Thus, merely including in the incremental backup identified objects having changes that occurred after the timestamp associated with a previous primary snapshot (e.g., identified changed objects occurring between t2 and t3) may lead to data integrity issues because clock skew may exist between a clock associated with the primary snapshots and a clock associated with the storage log.

A storage log of the primary storage system may be used to identify the objects that have changed since the previous backup. The storage log stores a plurality of events, each of the events has an associated timestamp. An event timestamp is based on a clock associated with the storage log, which is different than the snapshot service clock. Since clock skew may exist between the snapshot service clock and the storage log clock, it is not clear whether an event with a timestamp that occurred near a primary snapshot timestamp occurred before or after the primary snapshot. For example, a capture time associated with a primary snapshot may be 12:00:00 PM. A timestamp associated with an event included in a storage log may be 12:00:05 PM. Due to clock skew, it is not clear whether the primary snapshot occurred before or after the event.

In the example shown, an incremental backup of the primary storage system is generated based on the primary snapshot 204. A threshold time window 206 is determined. The timestamps of the boundaries of threshold time window 206 (e.g., t1 and t4) are based on a clock associated with the storage log. The threshold time window 206 includes events that are likely associated with the second primary snapshot 204. Some of the events included in threshold time window 206 are associated with the second primary snapshot 204. Some of the events included in threshold time window 206 may be associated with the first primary snapshot 202. Some of the events included in threshold time window 206 may be associated with a third primary snapshot to be performed at a later time (not shown).

To determine whether an event included in threshold time window 206 is associated with the first primary snapshot 202, the second primary snapshot 204, or should be associated with a third primary snapshot to be performed at a later time, the storage log is analyzed to identify changed objects having a timestamp that is within the threshold time window 206. For each identified changed object, a directory associated with the identified changed object in the second primary snapshot 204 is traversed. In some embodiments, the created object is a directory and a top level of the directory is traversed. In some embodiments, the created object is a file and a top level of the directory that includes the file is traversed.

In the event the identified changed object is an object creation and the created object is not included in the directory (e.g., the top level of the directory does not exist or the file does not exist), then the created file may be associated with a third primary snapshot to be performed at a later time. In the event the identified changed object is an object creation, the created file may be associated with the second primary snapshot 204 or the first primary snapshot 202 if the created object is included in the directory. To verify that the created object is associated with the second primary snapshot 204 and not the first primary snapshot 202, a secondary backup corresponding to the first primary snapshot 202 may be analyzed to determine if the created file is present in the secondary backup corresponding to the first primary snapshot 202. Metadata associated with the secondary backup corresponding to the first primary snapshot 202 may indicate whether the created object is present. For example, an index may list the file name associated with the created object or directory name associated with the created object, and a creation timestamp. If present, then the created object is not associated with the second primary snapshot 204 and not included in a secondary backup of the second primary snapshot 204. If the object is not present, then the created object is associated with the second primary snapshot and included in the secondary backup of the second primary snapshot 204.

In the event the identified changed object is an object deletion and the deleted object is included in the directory, then the event corresponding to the object deletion is associated with the third primary snapshot to be performed at a later time. In the event the identified changed object is an object deletion, the deleted object may be associated with the second primary snapshot 204 or the first primary snapshot 202 if the deleted object is not included in the directory. To verify that the deleted object is associated with the second primary snapshot 204 and not the first primary snapshot 202, a secondary backup corresponding to the first primary snapshot 202 may be analyzed to determine if the deleted object is present in the secondary backup corresponding to the first primary snapshot 202. Metadata associated with the secondary backup corresponding to the first primary snapshot 202 may indicate whether the deleted object is present. For example, an index may list the file name associated with the deleted file or a directory name associated with the deleted directory. If present, then the deleted object is associated with the second primary snapshot 204 and is included in a change list corresponding to the secondary backup of the second primary snapshot 204. If the object is not present, then the deleted object is associated with the first primary snapshot 202 and is not included in the change list corresponding to the secondary backup of the second primary snapshot 204.

In the event the identified changed object is an object modification (e.g., the file is written to, or an attribute of the file is set, a directory is modified, metadata of the directory is modified, etc.), the modified object may be associated with second primary snapshot 204. An event in the storage log may indicate that an object was modified at a particular point in time that occurred after a capture time associated with the first primary snapshot 202. A directory associated with the object included in the second primary snapshot 204 may be traversed (i.e., either the directory itself or the directory of a file) to verify that the object is present in the second primary snapshot 204. If the object is included in the directory, then the metadata of the object may be inspected to determine a modification timestamp. In some instances, it may not be clear if the modification occurred before or after the second primary snapshot 204. For example, the object may have been modified within the time range of t1 to t3. The metadata of the object included in a secondary backup corresponding to the first primary snapshot 202 may be inspected to determine a modification timestamp. In the event the modification timestamp included in the second primary snapshot 204 matches the modification timestamp included in the secondary backup corresponding to the first primary snapshot 202, then the object modification is determined not to be associated with the second primary snapshot 204 and the modified object is not included in a secondary backup of the second primary snapshot 204. In the event the modification timestamp included in the second primary snapshot 204 does not match the modification timestamp included in the secondary backup corresponding to the first primary snapshot 202, then the object modification is determined to be associated with the second primary snapshot 204 and the modified object is added to a change list. The objects included in the change list are obtained, if necessary, and included in a secondary backup of the second primary snapshot 204.

Identified changed objects that are determined to be associated with the second primary snapshot 204 are added to a change list. The objects included in the change list that are associated with create or modify data operations are obtained and included in a secondary backup of the second primary snapshot, that is, an incremental backup of the primary storage system.

FIG. 2B is a diagram illustrating an embodiment of a timeline associated with an incremental backup in accordance with some embodiments. In the example shown, timeline 250 illustrates a first primary snapshot 202 being taken at time t2 and a second primary snapshot 204 being taken at time t5

The amount of time and resources needed to identify the changed objects to include in the incremental backup may be further reduced by selectively traversing the file directory structures for objects having changes that occurred near the previous primary snapshot (e.g., within a first threshold time window 252) and objects having changes that occurred near the new primary snapshot (e.g., within a second threshold time window 256). Directories associated with the objects having changes that occurred between the first threshold time window 252 and the second threshold time window 256 (i.e., the time window represented by 254) do not need to be traversed because the clock skew between the snapshot service clock and storage log clock is unlikely to be great enough to cause a data integrity problem for these changed objects. The objects having changes that occurred between the first threshold time window 252 and the second threshold time window 256 have a high confidence level (e.g., confidence level greater than a threshold confidence level) that they are to be included in a secondary backup of the new primary snapshot.

Threshold time windows 252, 256 may be referred to as a "snapshot time window." In some embodiments, a capture time associated with primary snapshot 202 is a midpoint of threshold time window 252. Time markers t1 and t3 may be an equal amount of time (e.g., 2 minutes) from the capture time associated with primary snapshot 202. In some embodiments, a capture time associated with primary snapshot 204 is a midpoint of threshold time window 256. Time markers t4 and t6 may be an equal amount of time (e.g., 2 minutes) from the capture time associated with primary snapshot 204. In some embodiments, a time marker corresponds to one of the events included in the storage log. For example, time marker t1 may correspond to a last logged event having a timestamp before a capture time associated with primary snapshot 202 and time marker t3 may correspond to a first logged event having a timestamp after the capture time associated with primary snapshot 202. In some embodiments, a first known event (e.g., file creation) is performed (e.g., a first trigger event) to establish a time marker t1 and a second known event (e.g., deletion of the created file) is performed (e.g., a second trigger event) to establish a time marker t3. The primary snapshot is initiated after the first trigger event has occurred, the second trigger event is not initiated until the primary backup is completed. Accordingly, it is clear that the primary snapshot occurred at a time that is bounded by the trigger events. In some embodiments, the first known event and the second known event are associated with the same object. In some embodiments, the first known event and the second known event are associated with different objects. The first known event, the second known event, and associated timestamps are recorded in the storage log.

In some embodiments, a length of the threshold time window associated with a primary snapshot is refined. For example, the length of the threshold time window associated with a primary snapshot may be reduced from four minutes (e.g., 11:58 AM-12:02 PM) to two minutes (e.g., 11:59 AM-12:01 PM). This reduces the number of directory traversals performed by a primary system, which reduces the amount of time and resources to generate an incremental backup. The length of the threshold time window associated with a primary snapshot may also be reduced to determine a point in time at which the primary snapshot was performed. The length of the threshold time window associated with a primary snapshot may also be reduced to determine a high confidence time range within which the primary snapshot was performed. For example, a storage log may include 10 events that occurred in between t1 and t3. The length of the time range associated with the primary snapshot may be reduced to the point in time between events #6 and #7 by cross referencing the time stamps associated with the events with the primary snapshot. The primary snapshot may be inspected to determine whether an event is reflected in the primary snapshot. For example, one of the events may be a create event occurring at a particular point in time. The primary snapshot may be inspected to determine whether the object associated with the create event is included in the primary snapshot. In the event the object associated with the create event is included in the primary snapshot, then the primary snapshot is determined to have been performed after a timestamp associated with the create event.

An event included in threshold time windows 252 and 256 does not have a high confidence level (e.g., confidence level greater than a threshold confidence level) that indicates the event is associated with the second primary snapshot 204. An event included in time window 254 has a high confidence level that indicates the event is associated with the second primary snapshot.

The storage log is analyzed to identify events that occurred in the first threshold time window 252 and the second threshold time window 256. The identified events correspond to changed objects that may be associated with the first primary snapshot 202, the second primary snapshot 204, or a subsequent primary snapshot. The directories associated with the changed objects corresponding to the identified events are traversed to determine whether each of the changed objects is associated with the first primary snapshot 202, the second primary snapshot 204, or a subsequent primary snapshot. Directories associated with changed objects included in the first threshold time window 252 or the second threshold time window 256 are traversed because the clock skew between the snapshot service clock and storage log clock may cause a data integrity problem, that is, changed objects included in the first threshold time window 252 or the second threshold time window 256 cannot be determined to be included in the new primary snapshot with a high confidence level (e.g., confidence level greater than a threshold confidence level) by using the timestamps of the different clocks. Changed objects that are determined to be associated with the new primary snapshot are added to a change list. The objects included in the change list are obtained and included in an incremental backup of the primary storage system.

The storage log is further analyzed to identify objects having changes that occurred in time window 254. The identified events correspond to changed objects that are likely to have been captured by the second primary snapshot 204. The changed objects are aggregated in the change list. Unlike changed objects included in the first and second threshold time windows 252, 256, directories associated with changed objects corresponding to the identified events that occurred in time window 254 do not need to be traversed because the clock skew between the snapshot service clock and storage log clock is unlikely to be great enough to cause a data integrity problem.

A secondary backup of the new primary snapshot reflects the changed objects that are included in a change list. The secondary storage system is configured to perform each of the corresponding operations included in the change list. However, performing all of the operations associated with a particular changed object may waste the secondary storage system's resources (processing, storage, network, etc.). For example, the storage log may indicate that in the time window 254 an object was created, moved to a different location in the filesystem, modified, and then deleted. Using the secondary storage system's resources to perform all of those operations is a waste of resources because the end result is a deleted file. In another example, the storage log may indicate that in time window 254 an object was moved to ten different directories. Using the secondary storage system's resources to perform each of the move operations is a waste of resources because moving the object from its original directory to its final directory would accomplish the same end result while using less resources.

The resources needed by the secondary storage system to generate an incremental backup may be reduced by coalescing changes identified in the entries of the storage log occurring within the change tracking time window into a change tracking result set. The secondary storage system is configured to generate the change tracking result set by creating a tree data structure that represents object events occurring within time window 254. The events associated with storage log entries that occurred during the time window 254 are processed in chronological order and the tree data structure is updated to reflect the process of events associated with the storage log entries. The tree data structure is in an intermediate state until all of the storage log entries that occurred during time window 254 are processed. The tree data structure reaches a finalized state after all of the storage log entries that occurred during the time window 254 are processed. The finalized state of the tree data structure enables a plurality of operations associated with an object to be coalesced into a reduced number of operations.

The change tracking result set includes one or more entries for one or more changed objects. The one or more changed objects included in the change tracking result set are added to the change list. In some embodiments, a changed object is associated with a single operation that occurred during time window 254. The entry corresponding to the changed object includes the single operation. In some embodiments, a changed object is associated with a plurality of operations that occurred during time window 254. The change tracking result set may store a minimal number of entries (e.g., one or two) for the changed object.

In some embodiments, a changed object is included in the change tracking result set and also associated with an event that occurred during the first threshold time window 252 or the second threshold time window 256. Such objects are removed from the change tracking result set because it is unclear whether such objects need to be backed up. For example, an object may have been created during time window 254 but deleted during the second threshold time window 256. A selective traversal of the file directory structure will verify whether or not the changed object is to be included in the secondary backup of the primary storage system.

A secondary storage system is configured to send to the primary storage system a request for the items included in the change list. In response, the primary storage system is configured to send or provide access to the data and metadata associated with the requested changed objects. The secondary storage system is configured to ingest and store the data and metadata associated with the requested changed objects.

Figure 3:
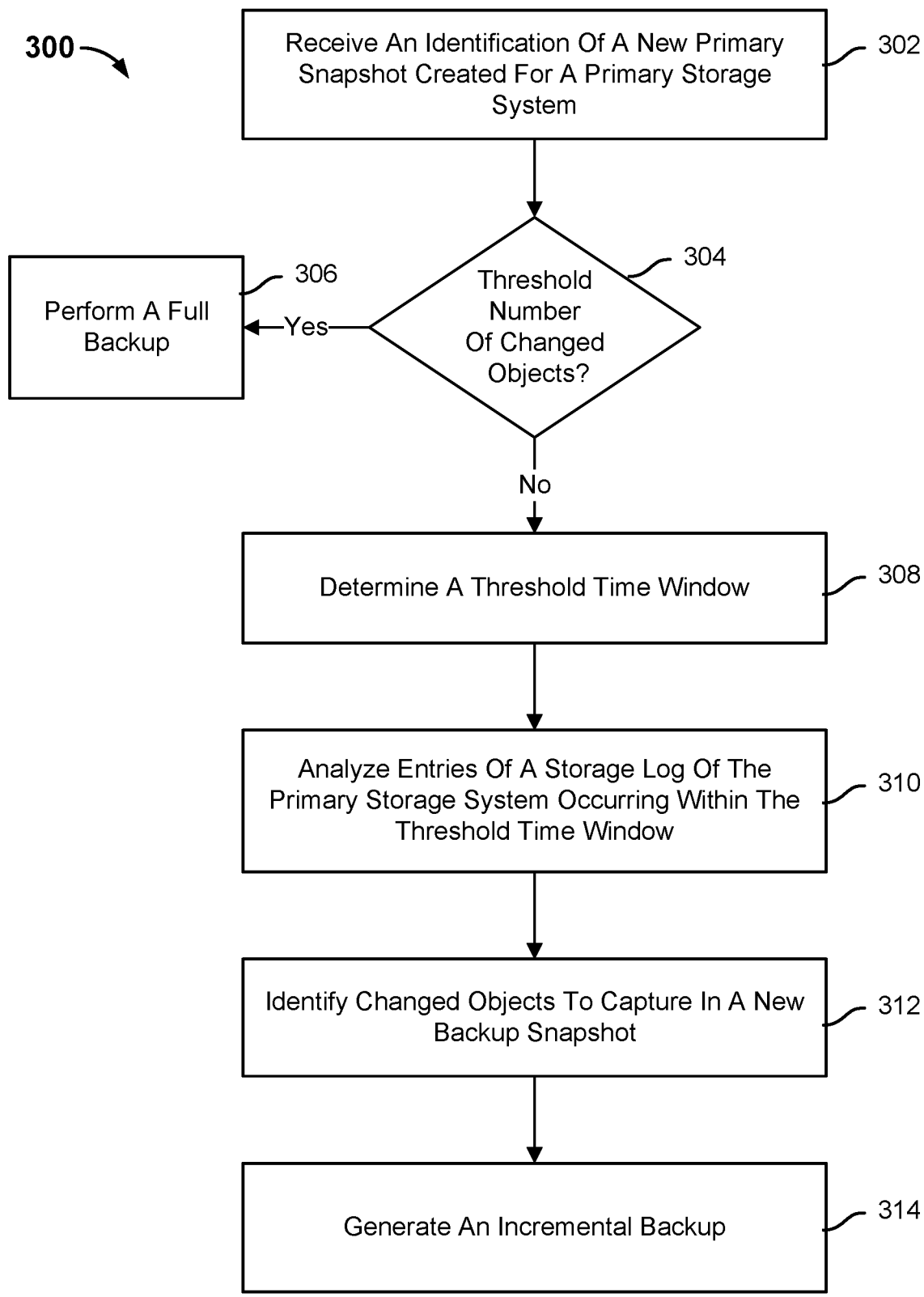
FIG. 3 is a diagram illustrating a process for generating an incremental backup in accordance with some embodiments.

FIG. 3 is a diagram illustrating a process for generating an incremental backup in accordance with some embodiments. In the example shown, process 300 may be implemented by a storage system, such as secondary storage system 112.

At 302, an identification of a new primary snapshot created for a primary storage system is received.

At 304, it is determined whether there are a threshold number of changed objects associated with the new primary snapshot. A storage log associated with the primary storage system may be analyzed to determine the number of changed objects associated with the new primary snapshot. In the event the number of changed objects associated with the new primary snapshot is greater than the threshold number of changed objects associated with the new primary snapshot, process 300 proceeds to 306. In the event the number of changed objects associated with the new primary snapshot is not greater than the threshold number of changed objects associated with the new primary snapshot, process 300 proceeds to 308.

At 306, a full backup of the new primary snapshot is performed. The storage system requests the primary storage system to provide all of the data associated with the new primary snapshot.

At 308, a threshold time window is determined. In some embodiments, the boundaries associated with the threshold time window include a first point in time based on the storage log clock that occurred before the capture time associated with a previous primary snapshot and a second point in time based on the storage log clock that occurred after the capture time associated with a new primary snapshot. The amount of time between the first point in time and the capture time associated with the previous primary snapshot may be based on an estimated amount of clock skew between a clock associated with the primary snapshots and a clock associated with the storage log. The amount of time between the second point in time and the capture time associated with the new primary snapshot may also be based on the estimated amount of clock skew between the clock associated with the primary snapshots and the clock associated with the storage log.

In some embodiments, a timestamp associated with a first event included in the storage log is selected as the first point in time that occurred before the capture time associated with a previous primary snapshot and a timestamp associated with a second event included in the storage log is selected as the second point in time that occurred after the capture time associated with the new primary snapshot. In some embodiments, the first and second events are associated with the same object. In some embodiments, the first and second events are associated with different objects. The first and second events are selected to establish points in time at which a primary snapshot is known to have occurred between.

In some embodiments, the threshold time window includes the first point in time that occurred before the capture time associated with the previous primary snapshot and a first point in time that occurred after the capture time associated with the previous primary snapshot. In some embodiments, the threshold time window includes the first point in time that occurred before the capture time associated with the new primary snapshot and the second point in time that occurred after the capture time associated with the new primary snapshot.

At 310, entries of a storage log of the primary storage system occurring within the threshold time window are analyzed to identify changed objects. Some of the entries stored in the storage log correspond to a change event. A change event may occur when an object is created, deleted, modified, and/or moved. Some of the entries included in the storage log correspond to other events associated with the primary storage system, such as when a user logged in, the number of failed login attempts associated with a device, the last time a software update was performed, the last time a password was changed, etc.

At 312, changed objects to capture in a new secondary backup are identified. The new secondary backup is a backup of the new primary snapshot. Entries of the storage log occurring within the threshold time window are analyzed to identify changed objects. Data and metadata included in the new secondary backup is backed up to a secondary storage system.

Directories associated with the identified changed objects are added to a list of directories to traverse. In some embodiments, a plurality of the identified changed objects is associated with the same directory. Instead of traversing the same directory a plurality of times, the list of directories to traverse may be deduplicated to include a single entry that corresponds to the directory that is shared by a plurality of entries. In some embodiments, the entries are deduplicated in-line (e.g., while the directories are being added to the list) or after the entire list of directories to traverse is completed.

In some embodiments, directories associated with all of the identified changed objects are traversed to verify that the identified changed objects are to be included in a secondary backup of the primary storage system. Identified changed objects that are verified are added to a change list. The objects included in the change list are obtained and included in the secondary backup of the new primary snapshot.

The identified changed objects may be verified to be included in the secondary backup by comparing metadata of the new primary snapshot and metadata of a previous secondary backup to determine for each of the objects of the primary storage system identified as being changed during the threshold time window whether a change to the object since the previous secondary backup is captured in the new primary snapshot.

For example, an event in the storage log may indicate that an object was created at a particular point in time that occurred after a capture time associated with a previous primary snapshot. For a created object, a directory associated with the created object included in the new primary snapshot may be traversed to verify that the created object is present in the new primary snapshot. In some embodiments, the created object is a directory and a top level of the directory is traversed. In some embodiments, the created object is a file and a top level of the directory that includes the file is traversed. If the object is not included in the directory (e.g., the top level of the directory does not exist or the file does not exist) and there are no other entries related to that object in the storage log, then the new primary snapshot was generated before the event and the new object is not included in the secondary backup of the primary storage system. If the created object is included in the directory, then the new primary snapshot was generated after the event.

However, it is not clear if the object was created before the previous primary snapshot (e.g., between t1 and t2 of FIGS. 2A, 2B) or after the previous primary snapshot (e.g., between t2 and t3 of FIGS. 2A, 2B). That is, it is not clear if the object should be included in the secondary backup. A secondary backup corresponding to the previous primary snapshot may be analyzed to determine if the object was created before the previous primary snapshot or after the previous primary snapshot. Metadata associated with the secondary backup corresponding to the previous primary snapshot may indicate whether the created object is present. For example, an index may list the file name associated with the created file or a directory name associated with a created object, and a creation timestamp. If present and there are no delete or create entries associated with the object in the storage log, then the created object is not associated with the new primary snapshot and not added to a change list of changed objects to include in a secondary backup of the new primary snapshot. If the object is not present, then the created object is associated with the new primary snapshot, added to the change list, and included in the secondary backup of the new primary snapshot.

In another example, an event in the storage log may indicate that an object was deleted at a particular point in time that occurred after a capture time associated with a previous primary snapshot. A directory associated with the object included in the new primary snapshot may be traversed (e.g., a top level of the directory or the directory of a file) to verify that the object is not present in the new primary snapshot. If the object is included in the directory, then the new primary snapshot was generated before the event (e.g., the object was deleted after t3 of FIG. 2A or deleted after t5 of FIG. 2B, or deleted before t2 of FIGS. 2A, 2B so long as there are not subsequent create operations for an object having the same name as the deleted object) and a changed object indicating the object deletion would not be included in the secondary backup of the new primary snapshot. If the object is not included in the directory, then the new primary snapshot was generated after the event (e.g., the object was deleted before t3 of FIG. 2A or t5 of FIG. 2B).

However, it is unclear if the object was deleted before or after the previous primary snapshot (e.g., before or after t2 of FIGS. 2A, 2B). A secondary backup corresponding to the previous primary snapshot may be analyzed to determine if the object was deleted before the previous primary snapshot or after the previous primary snapshot. Metadata associated with the secondary backup corresponding to the previous primary snapshot may indicate whether the deleted object is present. For example, an index may list the file name associated with the deleted file or a directory name associated with the deleted directory. If present, then the deleted object is associated with the new primary snapshot and is added to a change list of changed objects. If the object is not present, then the deleted object is associated with the previous primary snapshot and is not added to the change list of changed objects.

In another example, an event in the storage log may indicate that an object was modified at a particular point in time that occurred after a capture time associated with a previous primary snapshot. A directory associated with the object included in the new primary snapshot may be traversed (i.e., a top level of the directory or the directory of a file) to verify that the object is present in the new primary snapshot. If the object is included in the directory, then the metadata of the object may be inspected to determine a modification timestamp. In some instances, it may not be clear if the modification occurred before or after the second primary snapshot 204. For example, the object may have been modified within the time range of t1 to t3 of FIG. 2B. The metadata of the file included in a secondary backup corresponding to a previous primary snapshot may be inspected to determine a modification timestamp. In the event the modification timestamp included in the new primary snapshot matches the modification timestamp included in the secondary backup corresponding to the previous primary snapshot, then the object modification is determined not to be associated with the new primary snapshot and the modified object is not included in a secondary backup of the new primary snapshot. In the event the modification timestamp included in the new primary snapshot does not match the modification timestamp included in the secondary backup corresponding to the previous primary snapshot and there are no subsequent delete entries associated with the object in the storage log, then the object modification is determined to be associated with the new primary snapshot and the modified object is included in a secondary backup of the new primary snapshot.

In some embodiments, the amount of time and resources needed to generate the incremental backup is further reduced by selectively traversing the file directory structures for objects having changes that occurred near the previous primary snapshot (e.g., within a first threshold time window) and objects having changes that occurred near the new primary snapshot (e.g., within a second threshold time window). Directories associated with the objects having changes that occurred between the first threshold time window and the second threshold time window do not need to be traversed because the clock skew between the snapshot service clock and storage log clock is unlikely to be great enough to cause a data integrity problem for these changed objects. The objects having changes that occurred between the first threshold time window and the second threshold time window have a high confidence level (e.g., confidence level greater than a threshold confidence level) that they are to be included in a secondary backup of the new primary snapshot.

The first threshold time window corresponds to events that occurred near the previous primary snapshot. The first threshold time window includes a pre-marker that occurred before a capture time associated with the previous primary snapshot and a post-marker that occurred after the capture time associated with the previous primary snapshot. The markers provide consistency points for enabling correlation of the relevant storage log events and the primary snapshot from which data is being backed up.

Events included in the first threshold time window correspond to events that do not have a high confidence level that indicates the event is associated with the new primary snapshot. Directories of changed objects included in the first threshold time window are traversed to verify that the identified changed objects are to be included in a secondary backup of the primary storage system. Identified changed objects that are verified are added to a change list of changed objects and included in the secondary backup of the new primary snapshot.

The second threshold time window corresponds to events that occurred near the new primary snapshot. The second threshold time window includes a pre-marker that occurred before a capture time associated with the new primary snapshot and a post-marker that occurred after the capture time associated with the new primary snapshot. The markers provide consistency points for enabling correlation of the relevant storage log events and the primary snapshot from which data is being backed up.

Events included in the second threshold time window correspond to events that do not have a high confidence level that indicates the event is associated with the new primary snapshot. Directories of changed objects included in the second threshold time window are traversed to verify that the identified changed objects are to be included in a secondary backup of the primary storage system. Identified changed objects that are verified are added to a change list of changed objects. The objects included in the change list that are associated with create or modify data operations are obtained and included in the secondary backup of the new primary snapshot. Objects included in the change list that are associated with delete or move operations are not obtained, but an indication of the delete or move operations is stored. The secondary storage system may use the indication to update its own metadata that represents a state of the primary storage system at a point in time corresponding to the new primary snapshot.

The storage log is further analyzed to identify events that occurred in a change tracking time window (e.g., a period of time between the first and second threshold time windows). The identified events correspond to changed objects that are likely to have been captured by the new primary snapshot. Unlike changed objects included in the first and second threshold time windows, directories associated with changed objects corresponding to the identified events that occurred between the first and second threshold time windows do not need to be traversed because the clock skew between the snapshot service clock and storage log clock is unlikely to be great enough to cause a data integrity problem.

The changed objects are aggregated in the change list. As discussed above, the change list indicates the objects and one or more corresponding operations to perform with respect to previously backed up versions of the objects or one or more corresponding operations to perform with respect to a new version of an object. In some embodiments, the storage log may store for an object a plurality of entries that occurred within the change tracking time window.

A secondary backup of the new primary snapshot reflects the changed objects that are included in a change list. The secondary storage system is configured to perform each of the corresponding operations included in the change list. However, performing all of the operations associated with a particular changed object may waste the secondary storage system's resources (processing, storage, network, etc.). For example, the storage log may indicate that in the change tracking time window an object was created, moved to a different location in the filesystem, modified, and then deleted. Using the secondary storage system's resources to perform all of those operations is a waste of resources because the end result is a deleted file. In another example, the storage log may indicate that in the change tracking time window an object was moved to ten different directories. Using the secondary storage system's resources to perform each of the move operations is a waste of resources because moving the object from its original directory to its final directory would accomplish the same end result while using less resources.

The resources needed by the secondary storage system to generate an incremental backup may be reduced by coalescing changes identified in the entries of the storage log occurring with the change tracking time window into a change tracking result set. The secondary storage system is configured to generate the change tracking result set by creating a tree data structure that represents object events occurring within the change tracking time window.

The tree data structure partially represents the file directory structure of the primary snapshot. The tree data structure is comprised of a plurality of nodes that correspond to nodes of the file directory structure of the primary snapshot. A node included in the tree structure corresponds to an object having one or more events that occurred within the change tracking time window or an object needed to traverse from a root node of the file directory structure of the primary snapshot to the object having one or more events that occurred within the change tracking time window.

The events associated with storage log entries that occurred during the change tracking time window are processed in chronological order and the tree data structure is updated to reflect the process of events associated with the storage log entries. The tree data structure is in an intermediate state until all of the storage log entries that occurred during the change tracking time window are processed. The tree data structure reaches a finalized state after all of the storage log entries that occurred during the change tracking time window are processed. The finalized state of the tree data structure enables a plurality of operations associated with an object to be coalesced into a reduced number of operations.

The change tracking result set includes one or more entries for one or more changed objects. The one or more changed objects included in the change tracking result set are added to the change list. In some embodiments, a changed object is associated with a single operation that occurred during the change tracking time window. The entry corresponding to the changed object includes the single operation. In some embodiments, a changed object is associated with a plurality of operations that occurred during the change tracking time window. The change tracking result set may store a minimal number of entries (e.g., one or two) for the changed object.

In some embodiments, a changed object is included in the change tracking result set and also associated with an event that occurred during the first threshold time window or the second threshold time window. Such objects are removed from the change tracking result set because it is unclear whether such objects need to be backed up. For example, an object may have been created during the change tracking time window but deleted during the second threshold time window (e.g., between t4 and t6 of FIG. 2B). A selective traversal of the file directory structure will verify whether or not the changed object is to be included in the secondary backup of the primary storage system.

At 314, an incremental backup of the primary storage system is generated. The secondary backup of the new primary snapshot is the incremental backup of the primary storage system and includes identified changed objects that are determined to be associated with the new primary snapshot. A secondary storage system is configured to send to the primary storage system a request for the identified changed objects. In response, the primary storage system is configured to send or provide access to the data and metadata associated with the identified changed objects. In response to receiving the data and metadata associated with the identified changed objects, the secondary storage system is configured to ingest and store the received data and metadata.

Figure 4:
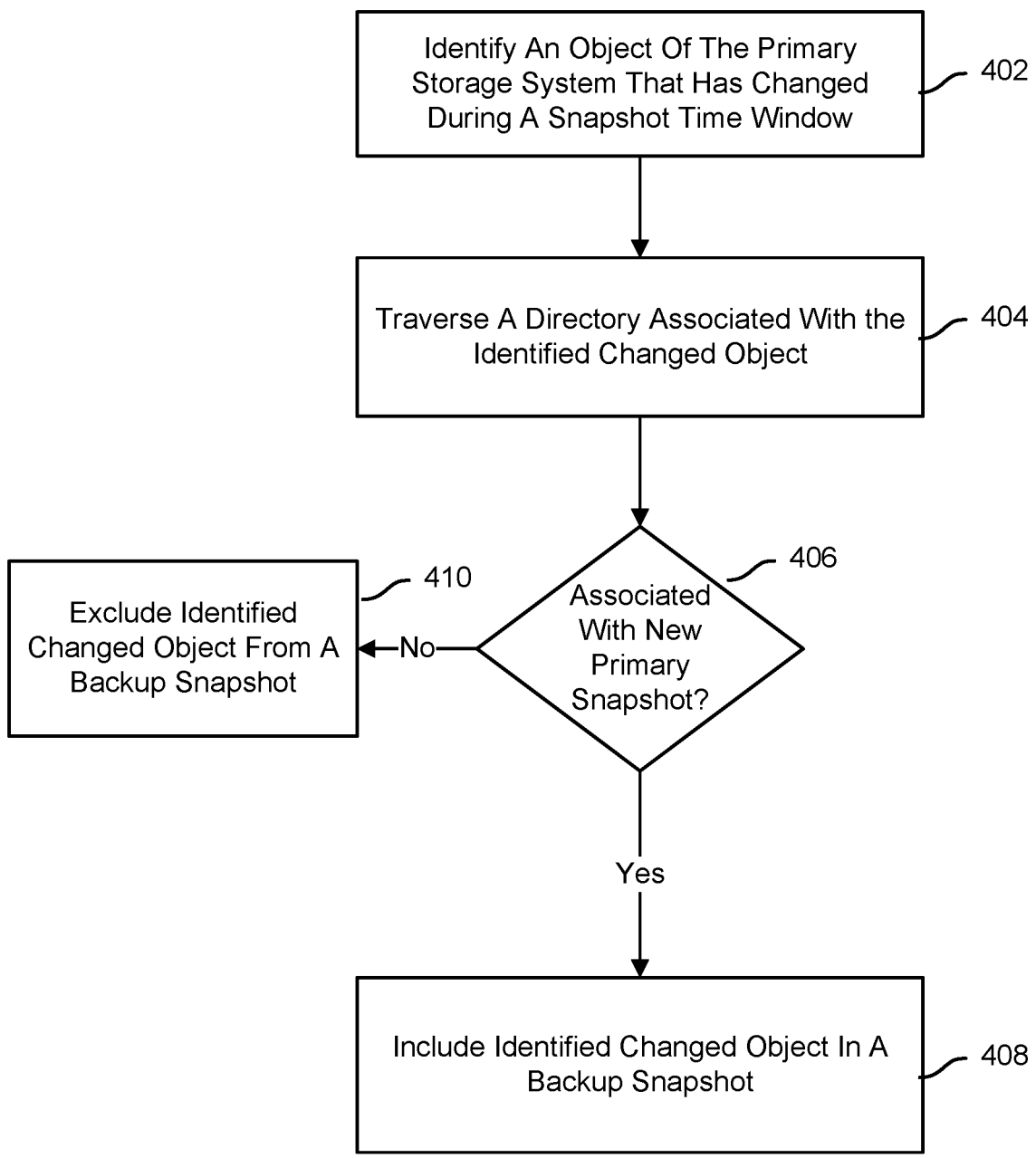
FIG. 4 is a diagram illustrating a process for identifying changed objects to include in an incremental backup in accordance with some embodiments.

FIG. 4 is a diagram illustrating a process for identifying changed objects to include in an incremental backup in accordance with some embodiments. In the example shown, process 400 may be implemented by a storage system, such as secondary storage system 112. In some embodiments, process 400 is implemented to perform some of step 312 of process 300.

At 402, an object of the primary storage system that has changed during a snapshot time window is identified. A snapshot time window corresponds to a time around near a primary snapshot. The boundaries of the snapshot time window include a pre-marker that occurs before a primary snapshot, such as pre-markers occurring at times t1 and t4 of FIG. 2B, and a post-marker that occurs after a primary snapshot, such as post-markers occurring at time t3 and t6 of FIG. 2B. A changed object is identified by analyzing a storage log and determining whether a timestamp associated with the changed object occurred within the snapshot time window. In some embodiments, the changed object is a created file, a deleted file, a modified file (e.g., data of the file was modified, an attribute of the file was modified), a moved file, or a combination thereof. In some embodiments, the changed object is a created directory, a deleted directory, a moved directory, or a combination thereof.

Directories associated with the identified changed objects are added to a list of directories to traverse. In some embodiments, a plurality of the identified changed objects is associated with the same directory. Instead of traversing the same directory a plurality of times, the list of directories to traverse may be deduplicated to include a single entry that corresponds to the directory that is shared by a plurality of entries. In some embodiments, the entries are deduplicated in-line (e.g., while the directories are being added to the list) or after the entire list of directories to traverse is completed.

At 404, a directory associated with the identified changed object is traversed. A primary snapshot includes a file directory structure. The file directory structure of the primary snapshot is traversed to determine whether the identified changed object is associated with a new primary snapshot. In some embodiments, the identified changed object is a directory and a top level of the directory is traversed. In some embodiments, the identified changed object is a file and a directory that includes the file is traversed.

At 406, it is determined whether the identified changed object is associated with a new primary snapshot based on the directory traversal. An identified changed object is associated with the new primary snapshot in the event the change to the identified changed object occurred after a previous primary snapshot and before the new primary snapshot.

In the event it is determined that the identified changed object is associated with the new primary snapshot, process 400 proceeds to 408 where the identified changed object is included in a secondary backup of the new primary snapshot. In the event it is determined that the identified changed object is not associated with the new primary snapshot, process 400 proceeds to 410 where the identified changed object is excluded from the secondary backup of the new primary snapshot.

Figure 5:
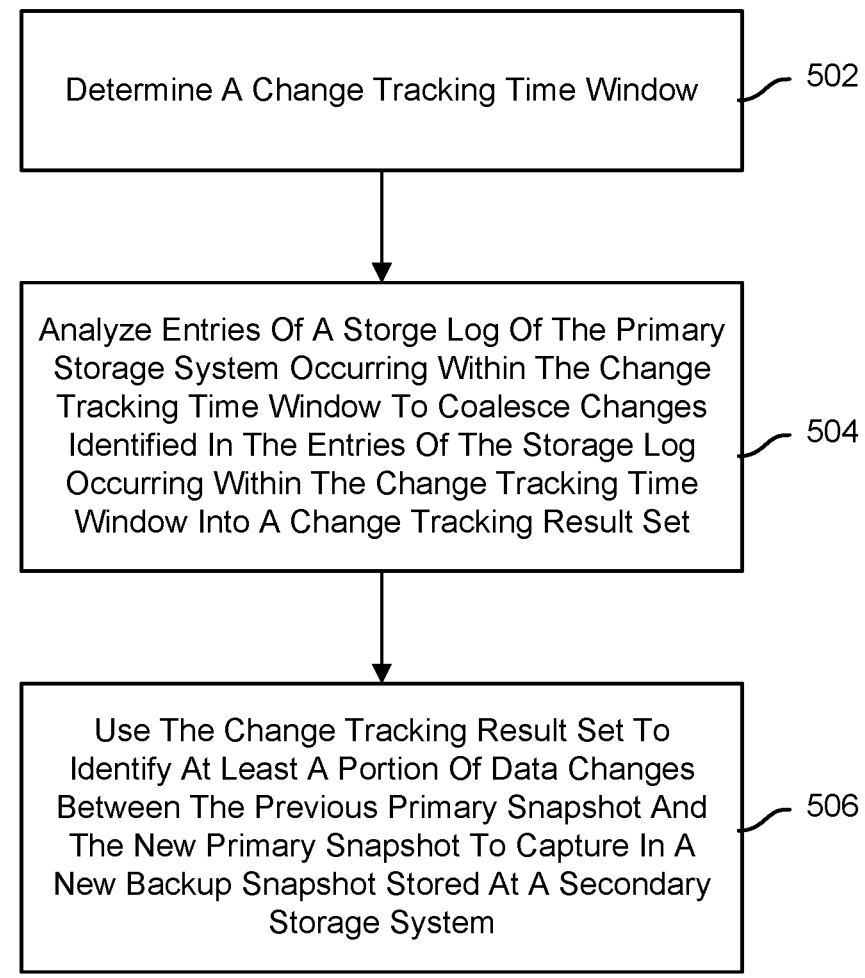
FIG. 5 is a diagram illustrating a process for identifying changed objects to include in an incremental backup in accordance with some embodiments.

FIG. 5 is a diagram illustrating a process for identifying changed objects to include in an incremental backup in accordance with some embodiments. In the example shown, process 500 may be implemented by a storage system, such as secondary storage system 112. In some embodiments, process 500 is implemented to perform some of step 312 of process 300.

At 502, a change tracking time window is determined. The change tracking time window corresponds to a portion of a period between a first capture time associated with a previous primary snapshot and a second capture time associated with a new primary snapshot. The change tracking time window begins at a post-marker that occurred after a capture time associated with the previous primary snapshot and ends at a pre-marker that occurred before a capture time associated with the new primary snapshot.

In some embodiments, the post-marker that occurred after a capture time associated with the previous primary snapshot is a particular amount of time (e.g., 2 minutes) from the capture time associated with the previous primary snapshot. In some embodiments, the post-marker that occurred after a capture time associated with the previous primary snapshot is a timestamp associated with an event included in the storage log that occurred after the previous primary snapshot.

In some embodiments, the pre-marker that occurred before a capture time associated with the new primary snapshot is a particular amount of time (e.g., 2 minutes) from the capture time associated with the new primary snapshot. In some embodiments, the pre-marker that occurred before a capture time associated with the new primary snapshot is a timestamp associated with an event included in the storage log that occurred before the new primary snapshot.

At 504, entries of a storage log of the primary storage system occurring within the change tracking time window are analyzed to coalesce changes identified in the entries of the storage log occurring within the change tracking time window into a change tracking result set. The secondary storage system is configured to generate the change tracking result set by creating a tree data structure that represents object events occurring within the change tracking time window. The events associated with storage log entries that occurred during the change tracking time window are processed in chronological order and the tree data structure is updated to reflect the process of events associated with the storage log entries. The tree data structure is in an intermediate state until all of the storage log entries that occurred during the change tracking time window are processed. The tree data structure reaches a finalized state after all of the storage log entries that occurred during the change tracking time window are processed. The finalized state of the tree data structure enables a plurality of operations associated with an object to be coalesced into a reduced number of operations (e.g., one or two).

The tree data structure is comprised of a plurality of nodes that correspond to nodes of the file directory structure of the primary snapshot. Each node of the tree data structure is associated with a corresponding data structure (e.g., struct). The node data structure is configured to store properties related to the node. For example, the node data structure may store a multi-bit flag (e.g., 8-bit flag) that indicates information, such as whether the node is a dummy node, is a directory, is associated with a creation operation, is associated with a write operation, and/or is associated with a set attribute operation (e.g., modify metadata operation). The node data structure may also store other information, such as a list of any children nodes, a list of any children nodes that have been deleted, a pointer to a current parent node, a pointer to a previous parent node (set when a node is moved), a name of the node before a move (only updated for the first move), a target link, a list of moved children, a timestamp of a last operation on the node from the audit process (only referenced to ensure ordering of events to avoid conflicting events), etc.

At 506, the change tracking result set is used to identify at least a portion of data changes between the previous primary snapshot and the new primary snapshot to capture in a new backup snapshot stored at a secondary storage system. The change tracking result set includes one or more entries for one or more changed objects. The one or more changed objects included in the change tracking result set are added to the change list. In some embodiments, a changed object is associated with a single operation that occurred during the change tracking time window. The entry corresponding to the changed object includes the single operation. In some embodiments, a changed object is associated with a plurality of operations that occurred during the change tracking time window. The change tracking result set may store a minimal number of entries (e.g., one or two) for the changed object.

In some embodiments, a changed object is included in the change tracking result set and also associated with an event that occurred during the first threshold time window or the second threshold time window. Such objects are removed from the change tracking result set because it is unclear whether such objects need to be backed up. For example, an object may have been created during the change tracking time window but deleted during the second threshold time window (e.g., between t4 and t6 of FIG. 2B). A selective traversal of the file directory structure will verify whether or not the changed object is to be included in the secondary backup of the primary storage system.

Figure 6:
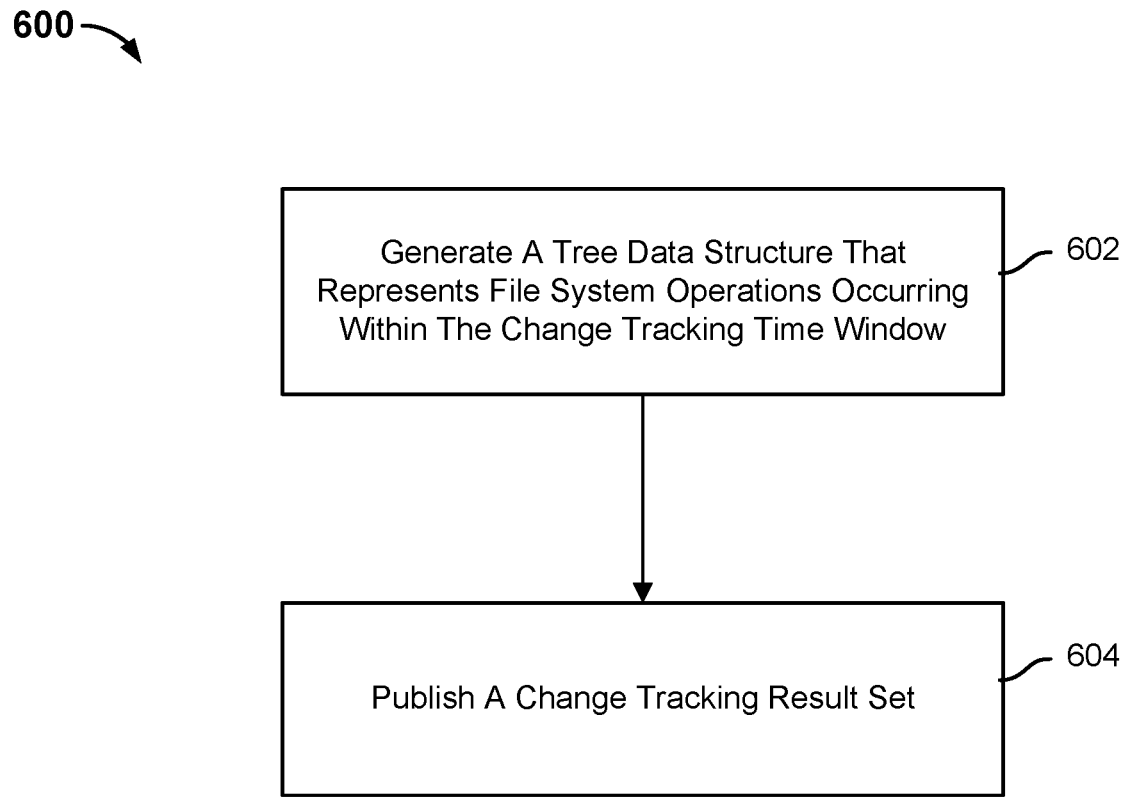
FIG. 6 is a diagram illustrating a process for coalescing changes identified in the entries of the storage log occurring within the change tracking time window identifying changed objects to include in an incremental backup in accordance with some embodiments.

FIG. 6 is a diagram illustrating a process for coalescing changes identified in the entries of the storage log occurring within the change tracking time window identifying changed objects to include in an incremental backup in accordance with some embodiments. In the example shown, process 600 may be implemented by a storage system, such as secondary storage system 112. In some embodiments, process 600 is implemented to perform some or all of step 504 of process 500.

At 602, a tree data structure that represents storage log events that occurred within the change tracking time window is generated. The tree data structure is generated based on a chronological order of events stored in the storage log. The storage log is processed in chronological order and the tree data structure is updated to reflect the process of events. Examples of a storage log event may include a create object operation, a delete object operation, a write object operation, a set attribute operation, a move operation, or a create hardlink operation. An object may be associated with one or more storage log events that occurred within the change tracking time window. The one or more storage log events associated with an object may be any combination of a create object operation, a delete object operation, a write object operation, a set attribute operation, a move operation, and/or a create hardlink operation.

The tree data structure partially represents the file directory structure of the primary snapshot. The tree data structure is comprised of a plurality of nodes that correspond to nodes of the file directory structure of the primary snapshot. A node included in the tree structure corresponds to an object having one or more events that occurred within the change tracking time window or an object needed to traverse from a root node of the file directory structure of the primary snapshot to the object having one or more events that occurred within the change tracking time window.

Each node is associated with a corresponding data structure (e.g., a struct). A node data structure associated with a node may be updated based on one or more of the storage log events occurring within the change tracking time window.

The node data structure is configured to store various properties associated with a node. For example, the node data structure may store various properties associated with the node using a multi-bit flag. The multi-bit flag (e.g., 8 bits) may include a bit that is set if the node is a dummy node. The dummy node bit is set when the node is created in the tree data structure for the purposes of constructing a path for an object associated with an event. When a node is created in the tree data structure, nodes representing the file directory structure from the root node of the file directory structure to the node corresponding to the object having a change are created. These intervening nodes are initially marked as "dummy nodes" and initially do not correspond to an object that has changed. A dummy node may be converted into a regular node in the event an object to which the dummy node corresponds is associated with an event during the change tracking time window.

The multi-bit flag may include a bit that is set if the node is a directory. The multi-bit flag may include a bit that indicates if the node is associated with a create operation (e.g., the object corresponding to the object was created during the change tracking time window). The multi-bit flag may include a bit that indicates if data was written to a file represented by the node during the change tracking time window. The multi-bit flag may include a bit that indicates if any attributes were set for an object corresponding to the node during the change tracking time window. The bits are initially set to a default value and are updated to reflect an event for an object corresponding to the node. The default value may be "1" in the event the node is a dummy node.

The node data structure includes a variable that indicates the one or more children nodes, if any, associated with the node. For example, the node may correspond to a directory and the variable may store the names of nodes corresponding to subdirectories and/or files included in the directory.

The node data structure includes a variable that indicates whether any of the children nodes associated with the node have been deleted. For example, the node may correspond to a directory. A subdirectory and/or one or more files included in the directory may have been deleted during the change tracking time window. This variable is needed because some of the children nodes may have been moved and the data structures associated with the moved nodes may include a reference to the original parent node. This variable initially has a default value, such as a null value. When this value is changed from the default value, this indicates that one or more of the children nodes associated with the node have been deleted or moved.

The node data structure includes a variable that indicates a pointer to a parent node. The node data structure includes a variable that indicates a pointer to a previous parent node. The previous parent variable is set when a node is moved. This variable initially has a default value, such as a null value.

The node data structure includes a variable that indicates a previous name for the node. For example, a node may have moved (e.g., in Linux) from "/a/b.txt" to /c/d.txt." In this example, the previous name is set to "b.txt." This variable initially has a default value, such as a null value and is updated for the first move associated with a node.

The node data structure includes a variable that indicates a target link for the node. This variable initially has a default value, such as a null value. This variable is set for hard links.

The node data structure includes a variable that indicates one or more children nodes associated with the node that have been moved. This variable initially has a default value, such as a null value.

The node data structure includes a variable that indicates a timestamp associated with a node event. This variable stores the last operation on this node from the storage log process.

At 604, a change tracking result set is published. The change tracking result set is published by adding the one or more entries included in the change tracking result set to a change list. The change list indicates the objects and one or more corresponding operations to perform with respect to previously backed up versions of the objects or one or more corresponding operations to perform with respect to a new version of an object. The objects included in the change list that are associated with create or modify operations are obtained and included in a secondary backup of the new primary snapshot to generate an incremental backup of the primary storage system.

Each of the entries included in the change tracking result set is associated with a corresponding object. In some embodiments, an object is associated with a single operation during the change tracking time window and the change tracking result set includes a single entry corresponding to the object. In some embodiments, an object is associated with a plurality of operations during the change tracking time window and the change tracking result set includes a reduced number of entries corresponding to the object (e.g., one or two). The tree data structure that partially represents the file directory structure of the primary snapshot is processed to determine the plurality of entries of the change tracking result set. The tree data structure reaches a finalized state after all of the storage log entries that occurred during the change tracking time window are processed.

The tree data structure that partially represents the file directory structure of the primary snapshot is processed by inspecting a corresponding data structure associated with each node of the finalized tree data structure to determine one or more operations to perform with respect to the object corresponding to the node. An in-order traversal, a level order traversal, or other tree traversal algorithm may be used to inspect the tree data structure nodes.

A change tracking result entry indicates the type of operation to perform (e.g., create, delete, move, write, set attribute) a path, and an entity type (e.g., directory, file, hardlink).

Create Operation

In some embodiments, the creation bit in a node data structure associated with a node is set. A change tracking result entry for creation is published for the object corresponding to the node.

In some embodiments, an object corresponding to the node was created and moved during the change tracking time window. The creation bit and the previous parent variable are set in a node data structure associated with a node corresponding to the object to reflect these events. Instead of publishing two events, one for creating the object and one for moving the object from a first location to the second location, a change tracking result entry can be published that coalesces the two events into a single event. The change tracking result entry indicates that the object is created at the moved location.

In some embodiments, an object corresponding to the node was created and its data was modified during the change tracking time window. The creation bit and the write bit are set in a node data structure associated with a node corresponding to the object to reflect these events. Instead of publishing two events one for creating the object and one for modifying the object's data, a change tracking result entry can be published that coalesces the two events into a single event. The change tracking result entry indicates that the object is created. The modifications to the object's data occurring during the change tracking time window will be included in a backup of the object as a result of processing the single change tracking result entry.

In some embodiments, an object corresponding to the node was created and an attribute associated with the object was set and/or modified during the change tracking time window. The creation bit and the set attribute bit are set in a node data structure associated with a node corresponding to the object to reflect these events. Instead of publishing two events, one for creating the object and one for modifying/setting an attribute associated with the object, a change tracking result entry can be published that coalesces the two events into a single event. The change tracking result entry indicates that the object is created. The modifications to the object's attributes occurring during the change tracking time window will be included in a backup of the object as a result of processing the single change tracking result entry.

In some embodiments, an object corresponding to a directory was created during the change tracking time window. The creation bit and the directory bit are set in the node data structure associated with the node corresponding to the object, and a directory attribute is added to a node corresponding to the directory.

In the event the creation bit and the target link variable are set in the node data structure associated with the node, a change tracking entry is for a hardlink creation.

Delete Operation

In some embodiments, the data content of an object was modified and the object was deleted during the change tracking time window. A change tracking result entry for data content modification is not published for the object in the event the node data structure associated with a parent node indicates the parent node has one or more deleted children (the parent node of a node corresponding to the object that had data content modified and was deleted during the change tracking time window) and the write bit is set in a node data structure associated with a node corresponding to one of the deleted children (the node corresponding to the object that had data content modified and was deleted) because the node corresponding to the one of the deleted children was deleted during the change tracking time window.

In some embodiments, the metadata of an object was modified and the object was deleted during the change tracking time window. A change tracking result entry for the metadata modification is not published for the object in the event the node data structure associated with a parent node indicates the parent node has one or more deleted children (the parent node of a node corresponding to the object that had metadata modified and was deleted during the change tracking time window) and the set attribute bit is set in a node data structure associated with a node corresponding to one of the deleted children (the node corresponding to the object that had metadata modified and was deleted) because the node corresponding to the one of the deleted children was deleted during the change tracking time window.

In some embodiments, an object was created and deleted during the change tracking time window. A change tracking result entry for the object creation is not published for the object in the event the node data structure associated with a parent node indicates the parent node has one or more deleted children (the parent node of a node corresponding to the created object) and the creation bit is set in a node data structure associated with a node corresponding to one of the deleted children (the node corresponding to the created object) because the node corresponding to the one of the deleted children was deleted during the change tracking time window.

In some embodiments, an object was deleted during the change tracking time window. A change tracking result entry for the object deletion is published in the event the node data structure associated with a parent node indicates the parent node has one or more deleted children (the parent node of a node corresponding to the deleted object) and the previous parent variable is set in a node data structure associated with a node corresponding to one of the deleted children (the node corresponding to the deleted object) if none of the ancestor nodes associated with the parent node are deleted. Deletion of one of the ancestors will take care of the deletion of the decedent nodes (e.g., the node corresponding to the deleted object). As a result, deletion of an ancestor node corresponding to a deleted object and deletion of any decedent nodes corresponding to deleted objects will be coalesced into a single entry.

In some embodiments, an object corresponding to a directory was deleted during the change tracking time window. One or more entries corresponding to the one or more subdirectories associated with the deleted directory are not processed in the event the node data structure associated with a parent node indicates the parent node has one or more deleted children (the parent node of a node corresponding to the deleted directory) and the directory bit is set in a node data structure associated with a node corresponding to one of the deleted children (the node corresponding to the deleted directory). Thus, entries related to the one or more subdirectories associated with the directory are coalesced.

Move Operation

In some embodiments, an object corresponding to the node was moved during the change tracking time window. The node data structure associated with the moved node has a previous parent variable set. A change tracking result entry for the move is published for such a node. The initial location can be determined using the value stored by the previous parent variable in the node data structure of the moved node. The final location can be determined by traversing to the root of the tree data structure that corresponds to the file directory structure of the primary snapshot from the moved node using the value stored by the parent variable in the node data structure of the moved node.

In some cases, the moved object may be a directory (e.g., a directory bit is set), in which case the change tracking result entry indicates the object type of the object is a directory.

In some embodiments, an object was moved and the data content of the object was modified during the change tracking time window. Two change tracking result entries are published: a move entry and then a write entry, in that order to ensure data consistency when the file is backed up to the secondary storage system, in the event the previous parent variable and the write bit are set in the node data structure associated with a node. For example, a file "c.txt" may have been moved from "/a" to "/b" and has a path of "/b/c.txt". After the file "c.txt" was moved, another file "c.txt" having a path of "/a/c.txt" may be created. Both "c.txt" files appear in the current primary snapshot. To ensure that the write data is applied to the correct "c.txt" file, the move entry is published first and then a write entry is published.

Write Operation

In some embodiments, the data associated with an object corresponding to the node was modified during the change tracking time window. A write bit is set in a node data structure associated with a node. A change tracking result entry is published for such a node so that the file corresponding to the node can be backed up.

Set Attribute Operation

In some embodiments, metadata associated with an object corresponding to the node was modified during the change tracking time window. A set attribute bit is set in a node data structure associated with a node. A change tracking result entry is published so that data content of the object corresponding to the node is not backed up.

Figure 7A:
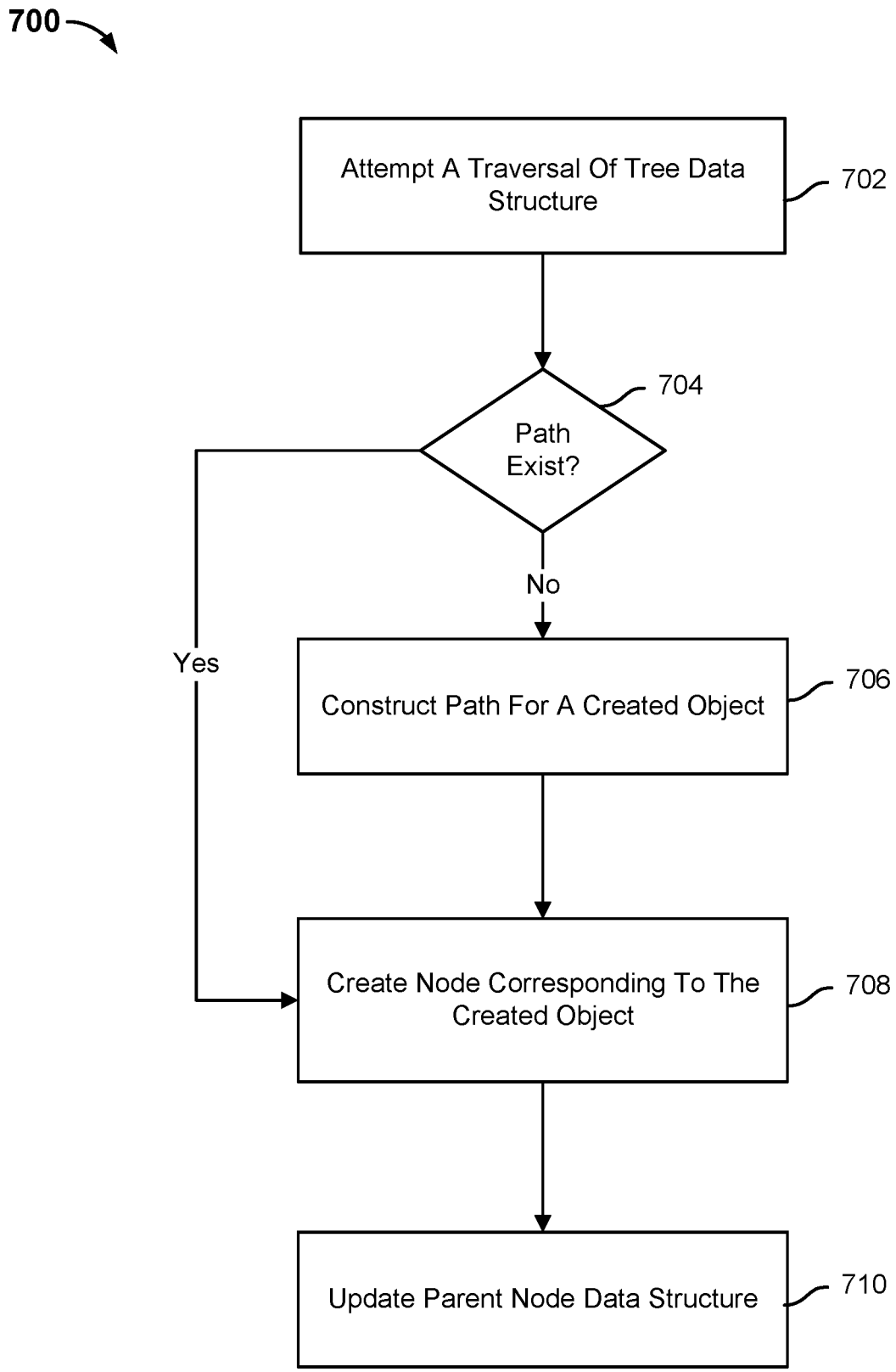
FIG. 7A is a diagram illustrating a process for updating a tree data structure for a create object event occurring within the change tracking time window in accordance with some embodiments.

FIG. 7A is a diagram illustrating a process for updating a tree data structure for a create object event occurring within the change tracking time window in accordance with some embodiments. In some embodiments, the created object is a file. In some embodiments, the created object is a directory. In the example shown, process 700 may be implemented by a storage system, such as secondary storage system 112. In some embodiments, process 700 is implemented to perform some or all of step 602 of process 600.

At 702, a traversal of a tree data structure is attempted. The tree data structure includes a root node corresponding to a root node of a file directory structure (e.g., "/"). The tree data structure is attempted to be traversed from the root node to a node corresponding to a created object.

At 704, it is determined whether the tree data structure includes a path from the root node corresponding to a root node of a file directory structure to a node corresponding to the created object. In the event the tree data structure does not include the path, then process 700 proceeds to 706. In the event the tree data structure includes the path, then process 700 proceeds to 708.

At 706, a path is constructed for a created object in the tree data structure. The path to the created object is constructed either in full or partially. The constructed path may include one or more nodes. The data structure associated with each existing node along the path is inspected. A node data structure of a node in the path to the created object includes a variable that lists the one or more children nodes associated with the node.

One or more nodes are created in the tree data structure in the event a node needed to traverse from the root node to the node corresponding to the created object does not exist in the tree data structure (e.g., the node is not included in the variable that lists the one or more children nodes associated with a parent node). The node data structure corresponding to the created node includes some indication of its status as a dummy node, for example, a bit that is set if the node is a dummy node. This bit is set because the node was created in the tree data structure for the purposes of constructing a path for the created object.

At 708, a node corresponding to the created object is created. The node data structure corresponding to the created object includes a bit that indicates if the node is associated with a create operation. This bit is set (e.g., to 1). In some embodiments, the created object is a directory and the bit that indicates if the node is a directory is set in the node data structure for the node corresponding to the created object.

At 710, the parent node of the node corresponding to the created object is updated. The node data structure of the parent node includes a variable that indicates the one or more children nodes associated with the node. The variable is updated to indicate that the node corresponding to the created object is a child node.

Figure 7B:
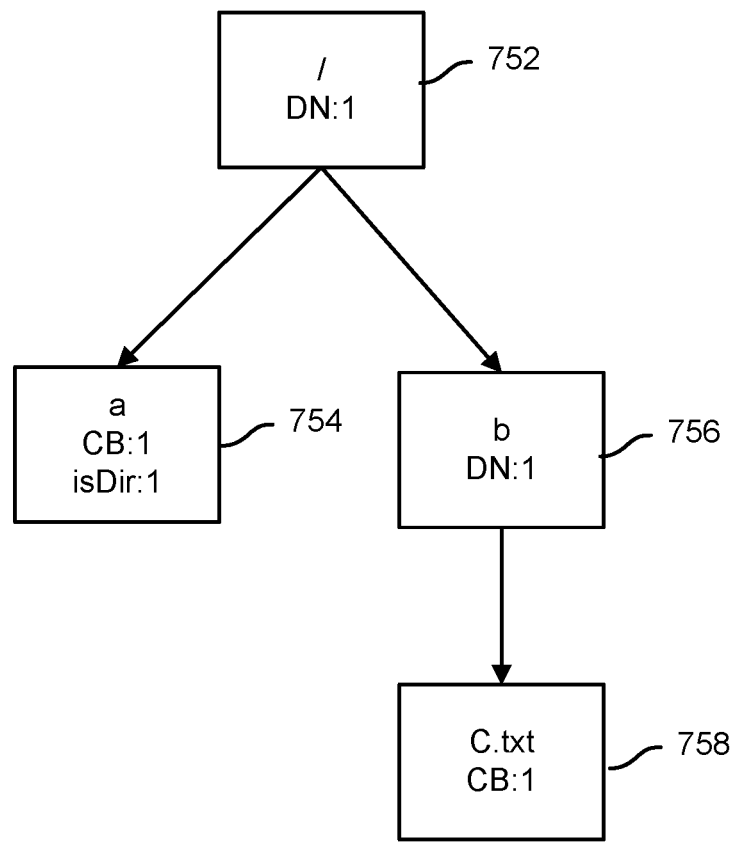
FIG. 7B is a diagram illustrating a tree data structure being updated for create object events occurring within the change tracking time window in accordance with some embodiments.

FIG. 7B is a diagram illustrating a tree data structure being updated for create object events occurring within the change tracking time window in accordance with some embodiments. In the example shown, tree data structure 750 initially includes a root node 752 represented by "/". The node data structure of node 752 includes a bit that is set if the node is a dummy node. The dummy node bit (e.g., DN) is set to 1 because the node is created in the tree data structure for the purposes of constructing a path for an object.

The storage log associated with a primary storage system may indicate that a directory and a file were created within the change tracking time window. An entry of the storage log indicates that the first directory "a" has a path of "/a". An entry of the storage log indicates that a file "C.txt" has a path of "/b/C.txt". Tree data structure 750 is updated to reflect the file system operations that occurred within the change tracking time window. A corresponding path is constructed for the first file and a corresponding path is constructed for the second file.

For the directory "a", tree data structure 750 is updated by creating a node corresponding to the directory 754 and connecting the node corresponding to the directory 754 to the root node 752. The data structure associated with root node 752 is updated to indicate that node 754 is a child node. The data structure associated with node 754 includes a bit that indicates if the node is associated with a create operation. The data structure associated with node 754 is updated by setting this bit to a value (e.g., CB:1) that indicates the node is associated with a create operation. The data structure associated with node 754 also includes a bit that indicates if the node is a directory. The data structure associated with node 754 is updated by setting this bit to a value (e.g., isDir:1) that indicates the node corresponds to a directory of the file system.

"C.txt" has a path of /b/C.txt". For the file, tree data structure 750 is updated by creating a node 756, which is needed to traverse tree data structure 750 from root node 752 to the file "C.txt". The data structure associated with node 756 includes a bit that is set if the node is a dummy node. This bit is set because the node was created in the tree data structure for the purposes of constructing a path for the created object. The data structure associated with node 756 is updated by setting this bit to a value (e.g., DN:1) that indicates node 756 is a dummy node that was created for the purposes of construction of a path for the node corresponding to the create operation.

Tree data structure 750 is updated by connecting the created node 756 to the root node 752. The data structure associated with root node 752 is updated to indicate that node 756 is a child node of root node 752. Tree data structure 750 is further updated by creating a node corresponding to the file 758 and connecting the created node 756 to the node corresponding to the file 758 by updating the data structure associated with node 756 to indicate that node 758 is a child node. The data structure associated with node 758 includes a bit that indicates if the node is associated with a create operation. The data structure associated with node 758 is updated by setting this bit to a value (e.g., CB:1) that indicates the node is associated with a create operation.

Figure 8A:
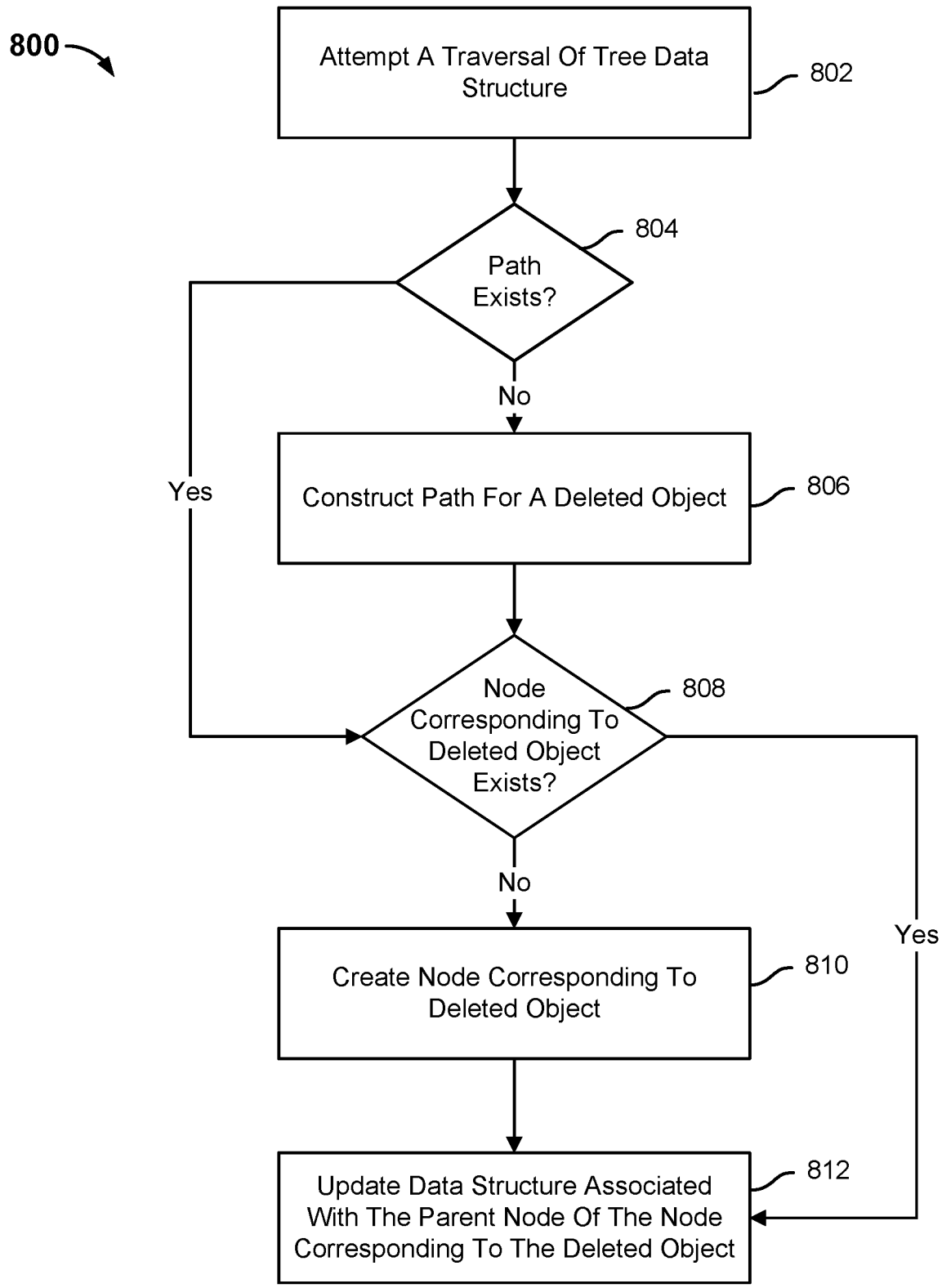
FIG. 8A is a diagram illustrating a process for updating a tree data structure for a delete object event occurring within the change tracking time window in accordance with some embodiments.

FIG. 8A is a diagram illustrating a process for updating a tree data structure for a delete object event occurring within the change tracking time window in accordance with some embodiments. In some embodiments, the deleted object is a file. In some embodiments, the deleted object is a directory. In the example shown, process 800 may be implemented by a storage system, such as secondary storage system 112. In some embodiments, process 800 is implemented to perform some or all of step 602 of process 600.

At 802, a traversal of a tree data structure is attempted. The tree data structure includes a root node corresponding to a root node of a file directory structure (e.g., "I"). The tree data structure is attempted to be traversed from the root node to a node corresponding to a deleted object.

At 804, it is determined whether the tree data structure includes a path from the root node corresponding to a root node of a file directory structure to a node corresponding to the deleted object. In the event the tree data structure does not include the path, then process 800 proceeds to 806. In the event the tree data structure includes the path, then process 800 proceeds to 808.

At 806, a path corresponding to a deleted object is constructed in the tree data structure. The path to the deleted object is constructed either in full or partially. The data structure associated with each existing node along the path is inspected. A node data structure of a node in the path to the created object includes a variable that lists the one or more children nodes associated with the node.

One or more nodes are created in the tree data structure in the event a node needed to traverse from the root node to the node corresponding to the deleted object does not exist in the tree data structure (e.g., the node is not included in the variable that lists the one or more children nodes associated with a parent node). The node data structure corresponding to the created node includes some indication of its status as a dummy node, for example, a bit that is set if the node is a dummy node. This bit is set because the node was created in the tree data structure for the purposes of constructing a path for the deleted object.

At 808, it is determined whether a node corresponding to the deleted object exists in the tree data structure. In the event a node corresponding to the deleted object exists, process 800 proceeds to step 812. In the event a node corresponding to the deleted object does not exist, process 800 proceeds to 810.

At 810, a node corresponding to the deleted object is created. The node data structure corresponding to the deleted object includes a variable that indicates a parent node. This variable is set to the name of the parent node. The node data structure corresponding to the deleted object includes a bit that indicates if the node corresponds to a directory. This bit is set to a value (e.g., 1) in the event the deleted object is a directory.

At 812, a data structure associated with the parent node of the node corresponding to the deleted object is updated. The node data structure of the parent node includes a variable that indicates the one or more children nodes associated with the node and a variable that indicates the one or more deleted children nodes associated with the node.

In some embodiments, the node corresponding to the deleted object did not exist in the tree data structure before step 808. In such an embodiment, the variable that indicates the one or more deleted children nodes associated with the node is updated to include the node corresponding to the deleted object.

In some embodiments, the node corresponding to the deleted object existed in the tree data structure at step 806. In such an embodiment, the node corresponding to the deleted object is removed from a variable of a node data structure of a parent node that indicates the one or more children nodes associated with the node and added to a variable that indicates the one or more deleted children nodes associated with the parent node.

FIG. 8B is a diagram illustrating a tree data structure being updated for delete object events occurring within the change tracking time window in accordance with some embodiments. In the example shown, tree data structure 850 initially includes a root node 752 represented by "/", a node 754 corresponding to a directory "a" that has a path of "/a", a node 756 corresponding to a directory "b" that has a path of "/b", and a node 758 that corresponds to a file "C.txt" having a path of "/b/C.txt".

For the change tracking time window, a storage log associated with a primary storage system may include a first entry that indicates the directory "a" was deleted, a second entry that indicates the file "/b/C.txt" was deleted, and a third entry that indicates the directory "/b" was deleted. Tree data structure 850 is updated to reflect the events stored by the storage log. Tree data structure 850 is updated in the order in which the entries are stored in the storage log.

Tree data structure 850 is initially updated by removing the connection 852 between root node 752 and the node 754 that corresponds to the directory "a". A storage system removes the connection by updating the data structure associated with root node 752. The data structure associated with root node 752 includes a variable that indicates the one or more children nodes associated with root node 752 and a variable that indicates the one or more deleted children nodes associated with the root node 752. The data structure associated with root node 752 is updated by moving node 754 from the variable that indicates the one or more children nodes associated with root node 752 to the variable that indicates the one or more deleted children nodes associated with root node 752.

Tree data structure 850 is subsequently updated by removing the connection 854 between node 756 that corresponds to the directory "/b" and node 758 that corresponds to the file "C.txt". A storage system removes the connection by updating the data structure associated with node 756. The data structure associated with node 756 includes a variable that indicates the one or more children nodes associated with node 756 and a variable that indicates the one or more deleted children nodes associated with the node 756. The data structure associated with node 756 is updated by moving node 758 from the variable that indicates the one or more children nodes associated with node 756 to the variable that indicates the one or more deleted children nodes associated with node 756. The node data structure corresponding to node 756 includes a bit that indicates if the node corresponds to a directory. This bit is set to a value (e.g., 1) to indicate the deleted object is a directory.

Tree data structure 850 is subsequently updated by removing the connection 856 between root node 752 and the node 756 that corresponds to the directory "/b". A storage system removes the connection by updating the data structure associated with root node 752. The data structure associated with root node 752 includes a variable that indicates the one or more children nodes associated with root node 752 and a variable that indicates the one or more deleted children nodes associated with the root node 752. The data structure associated with root node 752 is updated by moving a reference to node 756 from the variable that indicates the one or more children nodes associated with root node 752 to the variable that indicates the one or more deleted children nodes associated with root node 752.

Figure 9A:
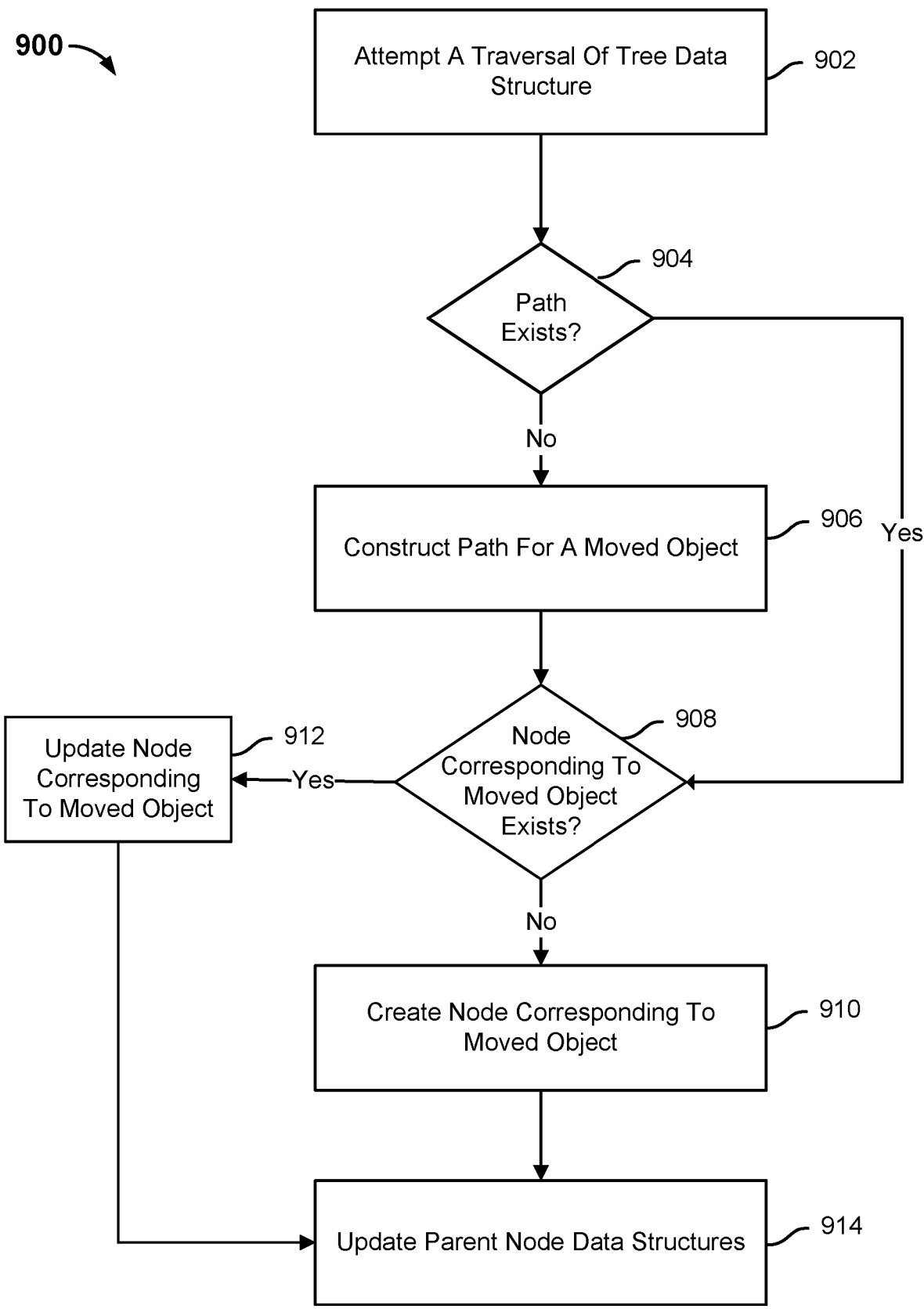
FIG. 9A is a diagram illustrating a process for updating a tree data structure for a move object event occurring within the change tracking time window in accordance with some embodiments.

FIG. 9A is a diagram illustrating a process for updating a tree data structure for a move object event occurring within the change tracking time window in accordance with some embodiments. In some embodiments, a file is moved. In some embodiments, a directory is moved. In the example shown, process 900 may be implemented by a storage system, such as secondary storage system 112. In some embodiments, process 900 is implemented to perform some or all of step 602 of process 600.

At 902, a traversal of a tree data structure is attempted. The tree data structure includes a root node corresponding to a root node of a file directory structure (e.g., "/"). The tree data structure is attempted to be traversed from the root node to a node corresponding to a moved object (i.e., the new location of the object within the file directory structure after the move event).

At 904, it is determined whether the tree data structure includes a path from the root node corresponding to a root node of a file directory structure to a node corresponding to the moved object. In the event the tree data structure does not include the path, then process 900 proceeds to 906. In the event the tree data structure includes the path, then process 900 proceeds to 908.

At 906, a path corresponding to a moved object is constructed in the tree data structure. The path to the moved object is constructed either in full or partially. The data structure associated with each existing node along the path is inspected. A node data structure of a node in the path to the moved object includes a variable that lists the one or more children nodes associated with the node.

One or more nodes are created in the tree data structure in the event a node needed to traverse from the root node to the node corresponding to the moved object does not exist in the tree data structure (e.g., the node is not included in the variable that lists the one or more children nodes associated with a parent node). The node data structure corresponding to the created node includes some indication of its status as a dummy node, for example, a bit that is set if the node is a dummy node. This bit is set because the node was created in the tree data structure for the purposes of constructing a path for the created object.

At 908, it is determined whether a node corresponding to the moved object exists in the tree data structure (i.e., a node that corresponds to the new location of the object within the file directory structure after the move event). In the event a node corresponding to the moved object exists in the tree data structure, process 900 proceeds to step 912. In the event a node corresponding to the moved object does not exist in the tree data structure, process 900 proceeds to 910.

At 910, a node corresponding to the moved object is created in the tree data structure. The created node corresponds to the new location of the object within the file directory structure after the move event. The node data structure corresponding to the moved object includes a variable that indicates a pointer to a parent node, a variable that indicates a pointer to a previous parent node, and a variable that indicates a previous name for the node. The variable that indicates a pointer to a parent node is updated to reflect the new parent node. The variable that indicates a pointer to a previous parent node is updated to reflect the previous parent node. The variable that indicates a previous name for the node is updated to reflect the previous name of the moved node. This is used to generate the original path in a change list entry to be published.

The node data structure corresponding to the moved object includes a bit that indicates if the node corresponds to a directory. This bit is set to a value (e.g., 1) in the event the moved object is a directory.

At 912, the node corresponding to the moved object is updated. The node data structure corresponding to the moved object includes a variable that indicates a pointer to a parent node, a variable that indicates a pointer to a previous parent node, and a variable that indicates a previous name for the node. The variable that indicates a pointer to a parent node is updated to reflect the new parent node. The variable that indicates a pointer to a previous parent node is updated to reflect the previous parent node. The variable that indicates a previous name for the node is updated to reflect the previous name of the moved node. This is used to generate the original path in a change list entry to be published.

At 914, parent node data structures are updated. The node data structure corresponding to the new parent node is updated. The node data structure includes a variable that indicates the one or more children nodes associated with the node. The variable is updated to indicate that the node corresponding to the moved object is a child node.

The node data structure corresponding to the previous parent node is updated. The node data structure includes a variable that indicates one or more children nodes associated with the node have been moved. This variable is updated to include the name of the moved node.

Figure 9B:
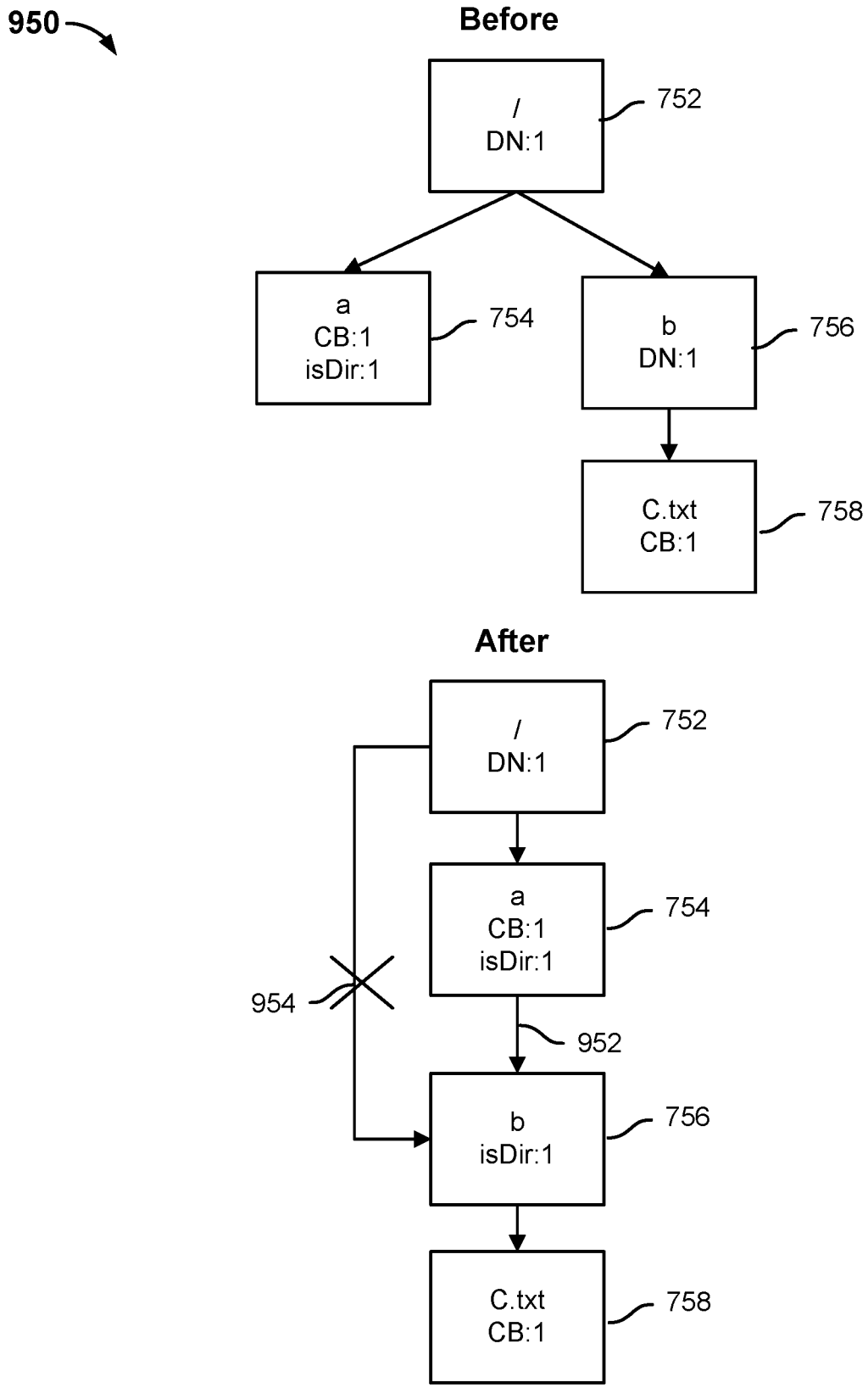
FIG. 9B is a diagram illustrating a tree data structure being updated for moved object events occurring within the change tracking time window in accordance with some embodiments.

FIG. 9B is a diagram illustrating a tree data structure being updated for moved object events occurring within the change tracking time window in accordance with some embodiments. In the example shown, tree data structure 950 initially includes a root node 752 represented by "/", a node 754 corresponding to a directory "a" that has a path of "/a", a node 756 corresponding to a directory "b" that has a path of "/b", and a node 758 that corresponds to a file "C.txt" having a path of "/b/C.txt".

The storage log associated with a primary storage system may include an entry that indicates a directory "b" is moved from "/b" to "/a". Tree data structure 950 is updated by updating the node data structure associated with node 756. The node data structure associated with node 756 includes a variable that indicates a pointer to a parent node, a variable that indicates a pointer to a previous parent node, and a variable that indicates a previous name for the node. The variable that indicates a pointer to a parent node is updated to reflect that node 754 is the new parent node for node 756. The variable that indicates a pointer to a previous parent node is updated to reflect that node 752 is the previous parent node for node 756. The variable that indicates a previous name for the node is updated to reflect the previous name of the moved node was "Ib". This is used to generate the original path in a change list entry to be published. The node data structure corresponding to node 756 includes a bit that indicates if the node corresponds to a directory. This bit is set to a value (e.g., 1) to indicate the moved object is a directory.

The parent node data structures are subsequently updated. The node data structure corresponding to the node 754 is updated. The node data structure of node 754 includes a variable that indicates the one or more children nodes associated with the node. The variable is updated to indicate that the node 756 is a child node.

The node data structure corresponding to the node 752 is updated. The node data structure includes a variable that indicates one or more children nodes associated with the node have been moved. This variable is updated to include node 756.

Figure 10A:
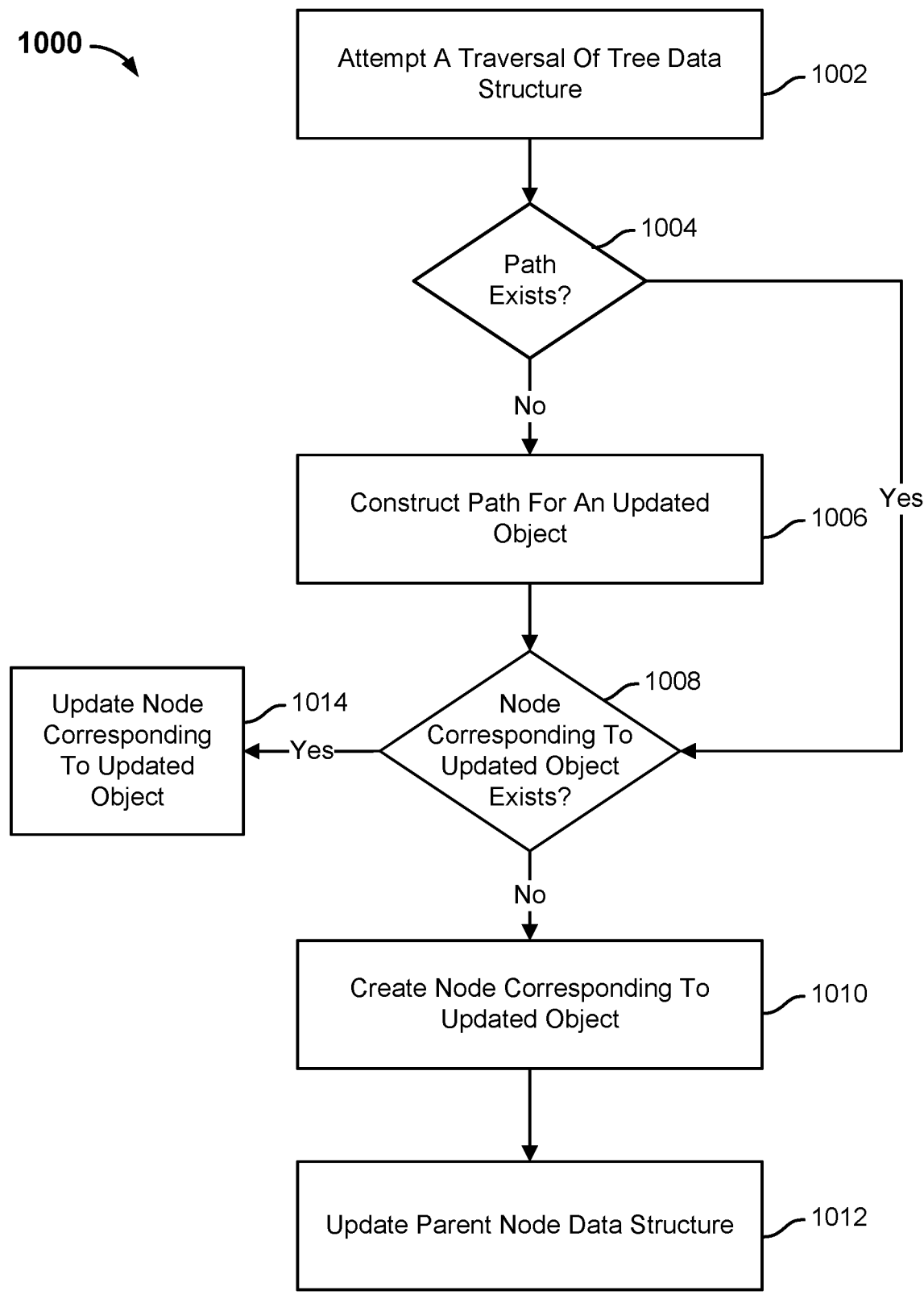
FIG. 10A is a diagram illustrating a process for updating a tree data structure for an updated object event occurring within the change tracking time window in accordance with some embodiments.

FIG. 10A is a diagram illustrating a process for updating a tree data structure for an updated object event occurring within the change tracking time window in accordance with some embodiments. In some embodiments, data content is written to a file. In some embodiments, an attribute associated with a file is set. In some embodiments, an attribute associated with a directory is set. In the example shown, process 1000 may be implemented by a storage system, such as secondary storage system 112. In some embodiments, process 1000 is implemented to perform some or all of step 602 of process 600.

At 1002, a traversal of a tree data structure is attempted. The tree data structure includes a root node corresponding to a root node of a file directory structure (e.g., "/"). The tree data structure is attempted to be traversed from the root node to a node corresponding to an updated object.

At 1004, it is determined whether the tree data structure includes a path from the root node corresponding to a root node of a file directory structure to a node corresponding to the updated object. In the event the tree data structure does not include the path, then process 1000 proceeds to 1006. In the event the tree data structure includes the path, then process 1000 proceeds to 1008.

At 1006, a path corresponding to an updated object is constructed in the tree data structure. The path to the updated object is constructed either in full or partially. The data structure associated with each existing node along the path is inspected. A node data structure of a node in the path to the created object includes a variable that lists the one or more children nodes associated with the node.

One or more nodes are created in the tree data structure in the event a node needed to traverse from the root node to the node corresponding to the updated object does not exist in the tree data structure. The node data structure corresponding to the created node includes some indication of its status as a dummy node, for example, a bit that is set if the node is a dummy node. This bit is set because the node was created in the tree data structure for the purposes of constructing a path for the created object.

At 1008, it is determined whether a node corresponding to the updated object exists. In the event a node corresponding to the updated object exists, process 1000 proceeds to step 1014. In the event a node corresponding to the updated object does not exist, process 1000 proceeds to 1010.

At 1010, a node corresponding to the updated object is created. The node data structure corresponding to the updated object includes a bit that indicates if the node corresponds to a directory. This bit is set to a value (e.g., isDir:1) in the event the created object is a directory.

The node data structure includes a bit that indicates if any attributes were set for the object corresponding to the node.

This bit is set to a value (e.g., S:1) that indicates if any attributes were set for the object (file or directory) corresponding to the node.

The node data structure includes a bit that indicates if any data was written to a file corresponding to the node. This bit is set to a value (e.g., W:1) that indicates if data was written to a file that corresponds to the node.

At 1012, a parent node data structure is updated. The node data structure corresponding to the parent node is updated. The node data structure includes a variable that indicates the one or more children nodes associated with the node. The variable is updated to indicate that a node corresponding to the updated object is a child node.

At 1014, the node corresponding to the updated object is updated. The node data structure includes a bit that indicates if any attributes were set for the object corresponding to the node. This bit is set to a value (e.g., 1) that indicates if any attributes were set for the object (file or directory) corresponding to the node.

The node data structure includes a bit that indicates if any data was written to a file in the primary snapshot that corresponds to the node. This bit is set to a value (e.g., 1) that indicates if data was written to a file in the primary snapshot that corresponds to the node.

FIG. 10B is a diagram illustrating a tree data structure being updated for updating object events occurring within the change tracking time window in accordance with some embodiments. In the example shown, tree data structure 1050 initially includes a root node 752 represented by "/", a node 754 corresponding to a directory "a" that has a path of "/a", a node 756 corresponding to a directory "b" that has a path of "/b", and a node 758 that corresponds to a file "C.txt" having a path of "/b/C.txt".

The storage log associated with a primary storage system may include an entry that indicates an attribute is set for a directory "a" and an entry that indicates data was written to a file "C.txt." Tree data structure 1050 is updated by updating the node data structure associated with node 754 and updating the node data structure associated with node 758.

The node data structure associated with node 754 includes a bit that indicates if any attributes were set for the node. This bit is set to a value (e.g., S:1) that indicates if any attributes were set for the directory "a".

The node data structure associated with node 758 includes a bit that indicates if any data was written to a file corresponding to the node. This bit is set to a value (e.g., W:1) that indicates if data was written to the file "C.txt".

Figure 11A:
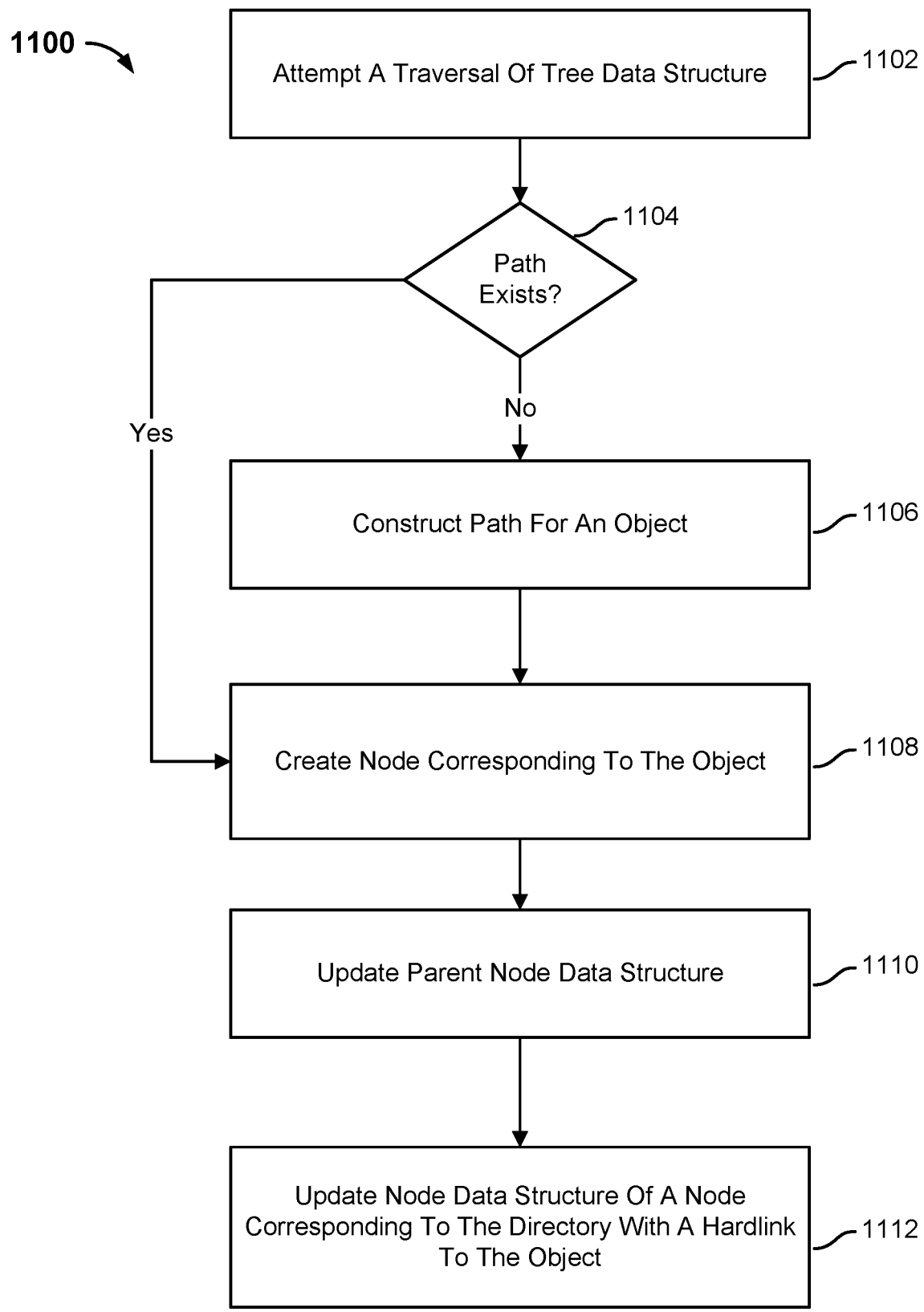
FIG. 11A is a diagram illustrating a process for updating a tree data structure for a hardlink creation event occurring within the change tracking time window in accordance with some embodiments.

FIG. 11A is a diagram illustrating a process for updating a tree data structure for a hardlink creation event occurring within the change tracking time window in accordance with some embodiments. An entry included in the storage log may correspond to a hardlink creation event. A hardlink may be created for a file. A hardlink is a directory entry that associates a name with a file on a file system. In the example shown, process 1100 may be implemented by a storage system, such as secondary storage system 112. In some embodiments, process 1100 is implemented to perform some or all of step 602 of process 600.

At 1102, a traversal of a tree data structure is attempted. The tree data structure includes a root node corresponding to a root node of a file directory structure (e.g., "/"). The tree data structure is attempted to be traversed from the root node to a node corresponding to a hardlinked object.

At 1104, it is determined whether the tree data structure includes a path from the root node corresponding to a root node of a file directory structure to a node corresponding to the hardlinked object. In the event the tree data structure does not include the path, then process 1100 proceeds to 1106. In the event the tree data structure includes the path, then process 1100 proceeds to 1108.

At 1106, a path corresponding to an object is constructed in the tree data structure. The path to the hardlinked object is constructed either in full or partially. The data structure associated with each existing node along the path is inspected. A node data structure of a node in the path to the created object includes a variable that lists the one or more children nodes associated with the node.

One or more nodes are created in the tree data structure in the event a node needed to traverse from the root node to the node corresponding to the hardlinked object does not exist in the tree data structure (e.g., the node is not included in the variable that lists the one or more children nodes associated with a parent node). The node data structure corresponding to the created node includes some indication of its status as a dummy node, for example, a bit that is set if the node is a dummy node. This bit is set because the node was created in the tree data structure for the purposes of constructing a path for the created object.

At 1108, a node corresponding to the hardlinked object is created.

At 1110, a parent node data structure is updated. The node data structure corresponding to the parent node is updated. The node data structure includes a variable that indicates the one or more children nodes associated with the node. The variable is updated to indicate that the updated object is a child node.

At 1112, a node data structure of a node corresponding to the directory with a hardlink to the object is updated. The node data structure includes a variable that indicates a target link for the node. The variable is updated to store the name of the hardlinked object.

FIG. 11B is a diagram illustrating a tree data structure being updated for a hardlink creation event occurring within the change tracking time window in accordance with some embodiments. In the example shown, tree data structure 1150 initially includes a root node 752 represented by "/", a node 754 corresponding to a directory "a" that has a path of "/a", a node 756 corresponding to a directory "b" that has a path of "/b", and a node 758 that corresponds to a file "C.txt" having a path of "/b/C.txt".

An entry included in the storage log associated with a primary storage system may indicate that a hardlink was created between a directory "a" and a file "C.txt". The node data structure associated with node 754 is updated. The node data structure associated with node 754 includes a variable that indicates a target link for the node. The variable is updated to store the name of the hardlinked object.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an identification of a new primary snapshot created for a primary storage system;
determining a change tracking time window that is at least a portion of a period between a first capture time associated with a previous primary snapshot and a second capture time associated with the new primary snapshot;
analyzing entries of a storage log of the primary storage system occurring within the change tracking time window to coalesce changes identified in the entries of the storage log occurring within the change tracking time window into a change tracking result set, wherein analyzing the entries of the storage log of the storage system occurring within the change tracking time window includes traversing in the new primary snapshot a directory associated with an object linked to an event in the storage log and analyzing the previous primary snapshot to verify the event in the storage log; and
using the change tracking result set to identify at least a portion of data changes between the previous primary snapshot and the new primary snapshot to capture in a new backup snapshot stored at a secondary storage system.

2. The method of claim 1, wherein the change tracking time window begins at a post-marker occurring after the first capture time associated with the previous primary snapshot and ends at a pre-marker occurring before the second capture time associated with the new primary snapshot.

3. The method of claim 2, wherein the post-marker that occurred after the first capture time associated with the previous primary snapshot is a particular amount of time from the first capture time.

4. The method of claim 2, wherein the post-marker that occurred after the first capture time associated with the previous primary snapshot is a timestamp associated with an event included in the storage log that occurred after the previous primary snapshot.

5. The method of claim 2, wherein the pre-marker that occurred before the second capture time associated with the new primary snapshot is a particular amount of time from the second capture time.

6. The method of claim 2, wherein the pre-marker that occurred before the second capture time associated with the new primary snapshot is a timestamp associated with an event included in the storage log that occurred before the new primary snapshot.

7. The method of claim 1, wherein coalescing the changes identified in the entries of the storage log occurring within the change tracking time window includes generating a tree data structure to represent objects having events occurring within the change tracking time window.

8. The method of claim 7, wherein generating the tree data structure includes processing, in chronological order, the object events occurring within the change tracking time window.

9. The method of claim 7, wherein the tree data structure includes a plurality of nodes, wherein at least one of the nodes corresponds to an object that is associated with a plurality of events occurring within the change tracking time window.

10. The method of claim 7, wherein each node included in the tree data structure is associated with a corresponding data structure.

11. The method of claim 10, wherein a node data structure for a node corresponding to an object stores information that represents the one or more events associated with the node that occurred within the change tracking time window.

12. The method of claim 7, wherein generating the tree data structure includes constructing corresponding paths for the objects that are associated with the events occurring within the change tracking time window.

13. The method of claim 7, further comprising publishing the change tracking result set.

14. The method of claim 13, wherein the published change tracking result set represents a final state of the tree data structure.

15. The method of claim 13, wherein one or more objects included in the published changed tracking result set are added to a change list.

16. The method of claim 15, wherein an object is removed from the published change tracking result set in the event the object is associated with a selective directory traversal.

17. The method of claim 1, further comprising generating an incremental backup of the primary storage system based in part on the change tracking result set.

18. A computer program product embodied in a non-transitory computer readable medium and comprising computer instructions for:
receiving an identification of a new primary snapshot created for a primary storage system;
determining a change tracking time window that is at least a portion of a period between a first capture time associated with a previous primary snapshot and a second capture time associated with the new primary snapshot;
analyzing entries of a storage log of the primary storage system occurring within the change tracking time window to coalesce changes identified in the entries of the storage log occurring within the change tracking time window into a change tracking result set, wherein analyzing the entries of the storage log of the storage system occurring within the change tracking time window includes traversing in the new primary snapshot a directory associated with an object linked to an event in the storage log and analyzing the previous primary snapshot to verify the event in the storage log; and
using the change tracking result set to identify at least a portion of data changes between the previous primary snapshot and the new primary snapshot to capture in a new backup snapshot stored at a secondary storage system.

19. The computer program product of claim 18, further comprising computer instructions for generating an incremental backup of the primary storage system based in part on the change tracking result set.

20. A system, comprising:
a processor configured to:
receive an identification of a new primary snapshot created for a primary storage system;
determine a change tracking time window that is at least a portion of a period between a first capture time associated with a previous primary snapshot and a second capture time associated with the new primary snapshot;
analyze entries of a storage log of the primary storage system occurring within the change tracking time window to coalesce changes identified in the entries of the storage log occurring within the change tracking time window into a change tracking result set including by traversing in the new primary snapshot a directory associated with an object linked to an event in the storage log and analyzing the previous primary snapshot to verify the event in the storage log; and use the change tracking result set to identify at least a portion of data changes between the previous primary snapshot and the new primary snapshot to capture in a new backup snapshot stored at a secondary storage system; and a memory coupled to the processor and configured to provide the processor with instructions.

\* \* \* \* \*